(12) United States Patent
Asai et al.

(10) Patent No.: US 6,222,980 B1
(45) Date of Patent: Apr. 24, 2001

(54) APPARATUS FOR GENERATING TIME CODE SIGNAL

(75) Inventors: Hiroshi Asai, Sagamihara; Masaki Ishiwata, Tokyo, both of (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/047,374

(22) Filed: Mar. 25, 1998

(30) Foreign Application Priority Data

Mar. 27, 1997 (JP) .................................... 9-076345
Apr. 10, 1997 (JP) .................................... 9-092592

(51) Int. Cl.$^7$ ..................... H04N 5/782; H04N 5/7822
(52) U.S. Cl. ................. 386/65; 386/60; 386/59
(58) Field of Search ................. 386/65, 61, 62, 386/57, 59, 52, 66, 46, 1, 4, 60; 360/72.1, 72.2, 72.3, 13, 69, 27, 49; H04N 5/782, 5/7822

(56) References Cited

U.S. PATENT DOCUMENTS

| 4,139,870 | 2/1979 | Tachi . |
| 4,189,756 | 2/1980 | Ninomiya . |
| 4,360,841 | 11/1982 | Mita . |
| 4,646,167 | * 2/1987 | Denecke .............................. 360/72.2 |
| 4,805,042 | * 2/1989 | Nishikata ............................... 360/49 |

FOREIGN PATENT DOCUMENTS 3632719    3/1988 (DE) .
5-128746   5/1993 (JP) .

OTHER PUBLICATIONS

"Time Code Error Correction Utilizing a Microprocessor" SMPTE Journal, vol. 88, No. 10, Oct. 1979, pp. 712–715, XP002089559.

* cited by examiner

*Primary Examiner*—Robert Chevalier
(74) *Attorney, Agent, or Firm*—Israel Gopstein

(57) ABSTRACT

A direction detector operates for detecting a direction of feed of a recording tape. A timer operates for counting pulses of a clock signal, and outputting a signal representing a first count value. A second count value is generated which corresponds to a pulse width related to a first bit represented by an input time code signal reproduced from the recording tape. The first count value which occurs at a first time point and the second count value are added into a first addition-result value. An output time code signal is inverted when the first count value currently represented by the output signal of the timer comes equal to the first addition-result value. A second bit is selected from among bits represented by the input time code signal in response to the direction detected by the direction detector. The second bit to be selected neighbors the first bit in a normal time direction when the detected direction agrees with a forward direction. The second bit to be selected neighbors the first bit in a reverse time direction when the detected direction agrees with a reverse direction. A third count value is generated which corresponds to a pulse width related to the second bit. The first count value which occurs at a second time point after the first time point and the third count value are added into a second addition-result value. The first addition-result value is updated into the second addition-result value.

6 Claims, 15 Drawing Sheets

APPARATUS FOR GENERATING TIME CODE SIGNAL

BACKGROUND OF THE INVENTION

1. Field of the Invention

This invention relates to an apparatus for generating a time code signal such as a longitudinal time code (LTC) signal in a recording and reproducing system using a tape-like recording medium. Also, this invention relates to an apparatus for reading out a time code signal. Furthermore, this invention relates to an apparatus for rearranging a time code signal.

2. Description of the Related Art

A typical helical-scan video tape recorder (VTR) includes a rotary drum on which magnetic heads are mounted. The magnetic heads rotate together with the rotary drum. A magnetic tape is wrapped on the rotary drum along a helix in a predetermined angular range. During a recording mode of operation of the VTR, an information signal containing a video signal is recorded on the magnetic tape via the magnetic heads while the rotary drum is rotated and the magnetic tape is fed in a given direction relative to the rotary drum. Specifically, the information signal is recorded on an array of slant tracks which are sequentially formed on the magnetic tape by the magnetic heads. The slant tracks extend along directions oblique with respect to the magnetic tape. During a playback mode of operation of the VTR, the slant tracks are sequentially scanned by the magnetic heads and hence the information signal is reproduced from the magnetic tape via the magnetic heads while the rotary drum is rotated and the magnetic tape is fed in the given direction relative to the rotary drum.

In general, the VTR also includes a fixed control head. During the recording mode of operation of the VTR, a control pulse signal having a constant period is recorded on the magnetic tape via the control head. Specifically, the control pulse signal is recorded on a control track which is formed by the control head on the magnetic tape along a longitudinal direction thereof During the playback mode of operation of the VTR, the control track is scanned by the control head and hence the control pulse signal is reproduced from the magnetic tape via the control head.

In a known business-use helical-scan VTR, a fixed head records a longitudinal time code (LTC) signal on a magnetic tape while forming a dedicated track for the LTC signal which extends along a longitudinal direction of the magnetic tape. The LTC signal represents an absolute position on the magnetic tape. During playback, the LTC signal track is scanned by the fixed head so that the LTC signal is reproduced from the magnetic tape.

The LTC signal has a sequence of 80-bit segments synchronized with frames represented by a video signal recorded on slant tracks on the magnetic tape. The 80-bit segments of the LTC signal are also referred to as the 1-frame-corresponding segments of the LTC signal. During reverse-direction playback, the 1-frame-corresponding segments of the reproduced LTC signal are arranged along a time base in the order opposite to the arrangement order in the original LTC signal. Also, the 80 bits of every 1-frame-corresponding segment of the reproduced LTC signal are arranged along a time base in the order opposite to the arrangement order in the original LTC signal. Such opposite arrangement orders of 1-frame-corresponding segments of an LTC signal and 80 bits of every 1-frame-corresponding segment are inconvenient to certain signal processing.

SUMMARY OF THE INVENTION

It is a first object of this invention to provide an improved apparatus for generating a time code signal.

It is a second object of this invention to provide an improved apparatus for reading out a time code signal.

It is a third object of this invention to provide an apparatus for rearranging a time code signal.

A first aspect of this invention provides a time code signal generating apparatus comprising a direction detector for detecting a direction of feed of a recording tape; a timer for counting pulses of a clock signal, and outputting a signal representing a first count value corresponding to a number of counted pulses; first means for generating a second count value corresponding to a pulse width related to a first bit represented by an input time code signal reproduced from the recording tape; second means for adding the first count value represented by the output signal of the timer at a first time point and the second count value generated by the first means into a first addition-result value; third means for comparing the first addition-result value generated by the second means and the first count value currently represented by the output signal of the timer to detect that the first count value currently represented by the output signal of the timer comes equal to the first addition-result value generated by the second means; fourth means for generating an output time code signal; fifth means for inverting the output time code signal generated by the fourth means when the third means detects that the first count value currently represented by the output signal of the timer comes equal to the first addition-result value generated by the second means; sixth means for selecting a second bit from among bits represented by the input time code signal in response to the direction detected by the direction detector, wherein the second bit to be selected neighbors the first bit in a normal time direction when the direction detected by the direction detector agrees with a forward direction, and the second bit to be selected neighbors the first bit in a reverse time direction when the direction detected by the direction detector agrees with a reverse direction; seventh means for generating a third count value corresponding to a pulse width related to the second bit selected by the sixth means; eighth means for adding the first count value represented by the output signal of the timer at a second time point after the first time point and the third count value generated by the seventh means into a second addition-result value; and ninth means for updating the first addition-result value used by the third means into the second addition-result value generated by the eighth means.

A second aspect of this invention is based on the first aspect thereof, and provides a time code signal generating apparatus wherein the input time code signal is recorded on the recording tape in synchronism with every frame represented by a video signal recorded on the recording tape.

A third aspect of this invention provides a time code signal reading apparatus comprising an edge detector for detecting every rising edge and every falling edge in an input time code signal, and generating an edge detection signal representative thereof; first means for detecting pulse widths of the input time code signal in response to the edge detection signal generated by the edge detector; second means for deciding logic states of bits in response to the pulse widths detected by the first means; third means for generating an active error flag when the pulse widths detected by the first means are arranged in an abnormal order; fourth means for detecting a sync word represented by the bits in the logic states decided by the second means; fifth means for deciding whether or not the sync word detected by the fourth means has a predetermined pattern, and generating a pattern decision signal representative thereof; sixth means for recovers a first time value from the bits in the logic states decided by the second means; and seventh means for correcting the first time value recovered by the sixth means into a second time value in response to the active error flag generated by the third means and the pattern decision signal generated by the fifth means.

A fourth aspect of this invention is based on the third aspect thereof, and provides a time code signal reading apparatus wherein the seventh means comprises eighth means for changing the first time value by a given value to convert the first time value to a third time value; ninth means for setting a seriality comparison value equal to the third time value generated by the eighth means; tenth means for changing the second time value by a predetermined value to update the second time value; eleventh means for, in cases where the active error flag is absent and the pattern decision signal represents that the sync word has the predetermined pattern, comparing the first time value with the seriality comparison value set by the ninth means at a previous moment to decide whether the first time value is equal to or different from the seriality comparison value set by the ninth means at the previous moment; twelfth means for enabling the eighth means, the ninth means, and the tenth means to operate when the eleventh means decides that the first time value is different from the seriality comparison value set by the ninth means at the previous moment; thirteenth means for changing the first time value by the given value to convert the first time value to the third time value when the eleventh means decides that the first time value is equal to the seriality comparison value set by the ninth means at the previous moment; fourteenth means for setting the seriality comparison value equal to the third time value generated by the thirteenth means; and fifteenth means for setting the second time value equal to the seriality comparison value set by the fourteenth means to update the second time value when the eleventh means decides that the first time value is equal to the seriality comparison value set by the ninth means at the previous moment.

A fifth aspect of this invention is based on the fourth aspect thereof, and provides a time code signal reading apparatus further comprising a direction detector for detecting a direction of feed of a recording tape from which the input time code signal is reproduced, and wherein the eighth means increments the first time value by the given value when the direction detected by the direction detector agrees with a forward direction, and decrements the first time value by the given value when the direction detected by the direction detector agrees with a reverse direction, wherein the tenth means increments the second time value by the predetermined value when the direction detected by the direction detector agrees with the forward direction, and decrements the second time value by the predetermined value when the direction detected by the direction detector agrees with the reverse direction, and wherein the thirteenth means increments the first time value by the given value when the direction detected by the direction detector agrees with the forward direction, and decrements the first time value by the given value when the direction detected by the direction detector agrees with the reverse direction.

A sixth aspect of this invention provides a time code signal rearranging apparatus comprising a bi-phase demodulator for subjecting a first time code signal reproduced from a magnetic tape to bi-phase demodulation to convert the first time code signal into a first sequence of time code bits; a direction detector for detecting a direction of feed of the magnetic tape; first means for dividing the first sequence of time code bits into segments each having a given number of time code bits; second means for, when the direction detected by the direction detector agrees with a reverse direction, reversing an arrangement order of time code bits in each of the segments generated by the first means to rearrange the first sequence of time code bits into a second sequence of time code bits; and a bi-phase modulator for subjecting the second sequence of time code bits generated by the second means to bi-phase modulation to convert the second sequence of time code bits into a second time code signal.

DESCRIPTION OF THE PREFERRED EMBODIMENTS

First Embodiment

A longitudinal time code (LTC) signal is recorded along a longitudinally-extending track on a magnetic tape. The LTC signal has a sequence of 80-bit segments synchronized with frames represented by a video signal recorded on an array of slant tracks on the magnetic tape. The 80-bit segments of the LTC signal are referred to as the 1-frame-corresponding segments of the LTC signal. The LTC signal is recorded on and reproduced from the magnetic tape frame by frame (1-frame-corresponding segment by 1-frame-corresponding segment).

Figure 1:
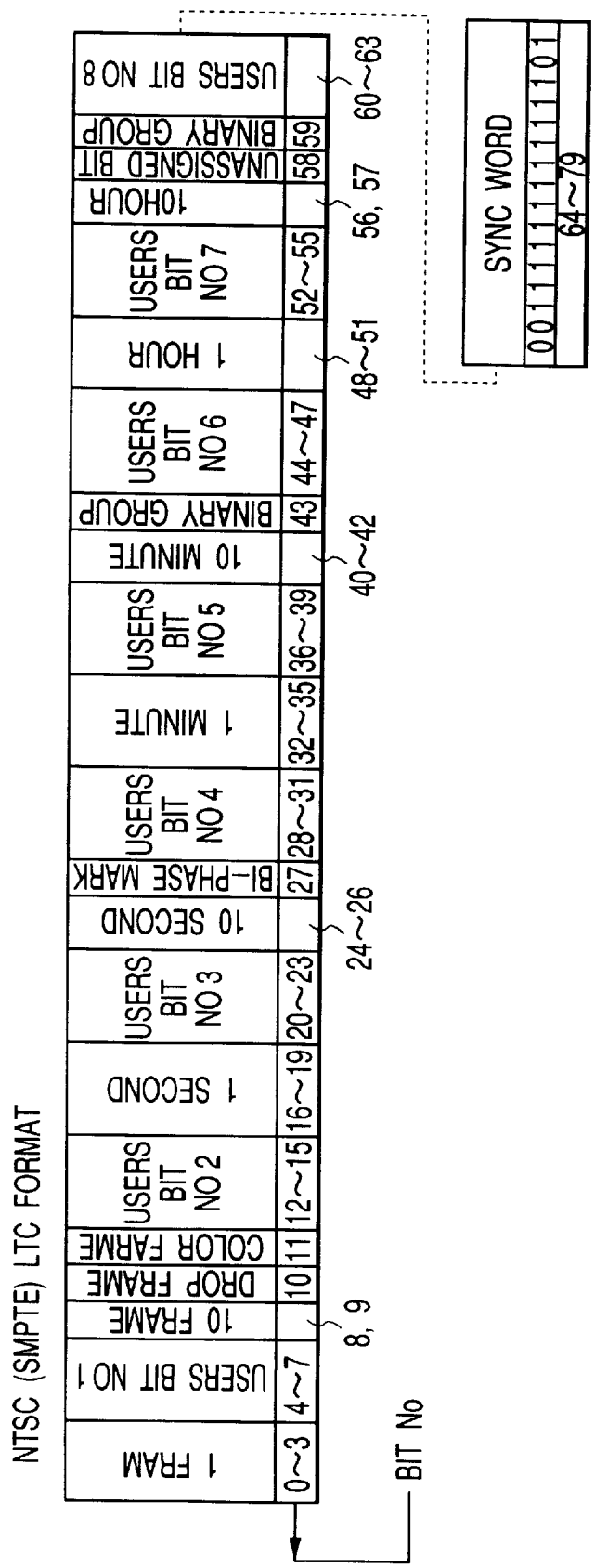
FIG. 1 is a diagram of a format of an LTC signal designed for an NTSC system.
Figure 2:
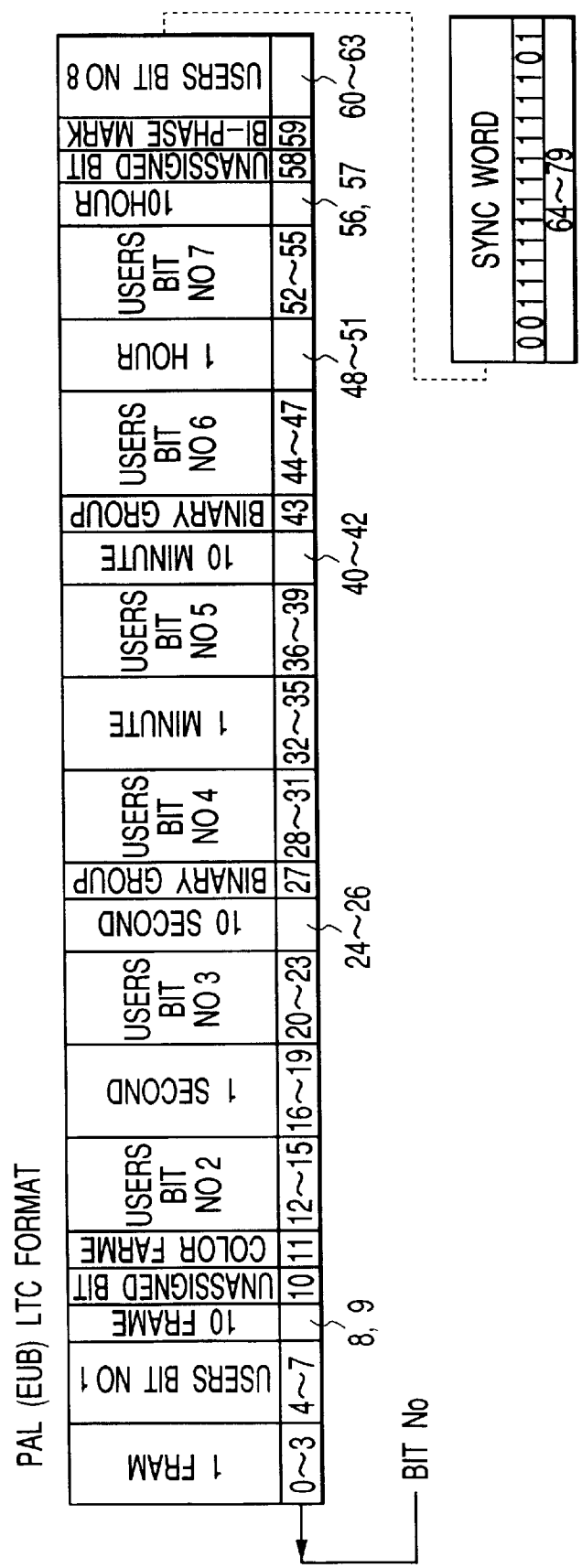
FIG. 2 is a diagram of a format of an LTC signal designed for a PAL system.

FIG. 1 shows a format of a 1-frame-corresponding segment (an 80-bit segment) of an LTC signal designed for an NTSC system. FIG. 2 shows a format of a 1-framecorresponding segment (an 80-bit segment) of an LTC signal designed for a PAL system. As shown in FIG. 1 or 2, a 1-frame-corresponding segment of the LTC signal has 80 bits which are given bit address numbers (bit position numbers) "0", "1", "2", ..., "79", respectively. The 80 bits in the 1-frame-corresponding segment of the LTC signal are assigned to various information pieces including an information piece related to "frame" (an information piece representing an order number of a related frame), an information piece related to "second", an information piece related to "minute", and an information piece related to "hour".

The LTC signal is subjected to bi-phase mark modulation before being recorded on the magnetic tape. In the modulation-resultant LTC signal, a level inversion (a level transition) occurs at a starting point of every 1-bit-corresponding period. In addition, for a bit in a logic state of "1", a level inversion (a level transition) occurs at a central point of a 1-bit-corresponding period. On the other hand, for a bit in a logic state of "0", a level inversion (a level transition) does not occur at a central point of a 1-bit-corresponding period. Accordingly, two different pulse widths are assigned to a bit in a logic state of "1" and a bit in a logic state of "0" respectively. The two different pulse widths are referred to as the "1"-corresponding pulse width and the "0"-corresponding pulse width, respectively. For example, the "0"-corresponding pulse width is equal to a 1-bit-corresponding period while the "1"-corresponding pulse width is equal to a half of a 1-bit-corresponding period.

During playback, the LTC signal is reproduced from the longitudinally-extending track on the magnetic tape. The reproduced LTC signal is subjected to pulse-width measurement to detect the logic state of every bit of the LTC signal. The detected bits of the LTC signal are converted into data representing time ("hour", "minute", "second", and "frame"). A tape absolute position is detected on the basis of the time data. The detected tape absolute position can be used in an editing process.

Figure 3:
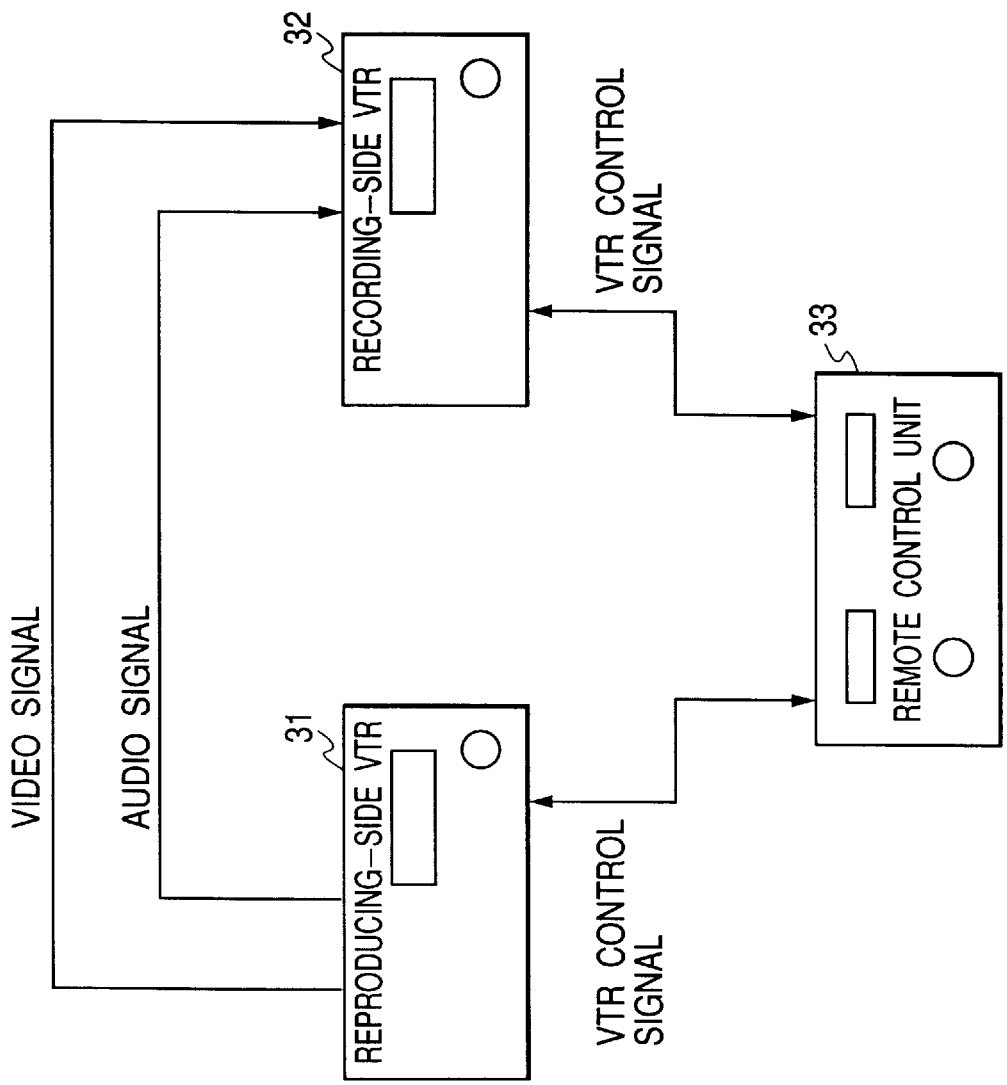
FIG. 3 is a block diagram of an editing system.

With reference to FIG. 3, an editing system includes a reproducing-side VTR (video tape recorder) 31 and a recording-side VTR 32 connected to each other. The editing system also includes a remote control unit 33 connected to both the reproducing-side VTR 31 and the recording-side VTR 32.

The reproducing-side VTR 31 reproduces a video signal and an audio signal from a magnetic tape. The reproducing-side VTR 31 feeds the reproduced video signal and the reproduced audio signal to the recording-side VTR 32. The recording-side VTR 32 records the video signal and the audio signal, which are fed from the reproducing-side VTR 31, on a magnetic tape.

The reproducing-side VTR 31 includes an apparatus for generating an LTC signal. VTR control signals are transmitted between the reproducing-side VTR 31 and the remote control unit 33. The LTC signal generated in the reproducing-side VTR 31 is contained in the VTR control signal transmitted from the reproducing-side VTR 31 to the remote control unit 33. Accordingly, the remote control unit 33 is informed of the LTC signal generated in the reproducing-side VTR 31.

The recording-side VTR 32 includes an apparatus for generating an LTC signal. VTR control signals are transmitted between the recording-side VTR 32 and the remote control unit 33. The LTC signal generated in the recording-side VTR 32 is contained in the VTR control signal transmitted from the recording-side VTR 32 to the remote control unit 33. Accordingly, the remote control unit 33 is informed of the LTC signal generated in the recording-side VTR 32.

The remote control unit 33 detects a currently-accessed position on the magnetic tape in terms of time ("hour", "minute", "second", and "frame") in the reproducing-side VTR 31 by referring to the LTC signal transmitted from the reproducing-side VTR 31. The remote control unit 33 detects a currently-accessed position on the magnetic tape in terms of time ("hour", "minute", "second", and "frame") in the recording-side VTR 32 by referring to the LTC signal transmitted from the recording-side VTR 32. Information of the currently-accessed positions on the magnetic tapes are used in, for example, pre-roll control to automatically move the currently-accessed positions to a desired editing position.

During an editing process, the remote control unit 33 generates a time signal on the basis of the LTC signal which is generated in the reproducing-side VTR 31 before an editing point.

The generated time signal is held serially updated even when time passes through the editing point. The remote control unit 33 feeds the generated time signal to the recording-side VTR 32. The recording-side VTR 32 uses the time signal in generating an LTC signal which remains serially updated in contents even when time passes through the editing point. The serially-updated LTC signal is recorded on the magnetic tape while the video signal and the audio signal are recorded thereon. Accordingly, the LTC signal on the editing-resultant magnetic tape maintains a seriality even at the editing point.

Figure 4:
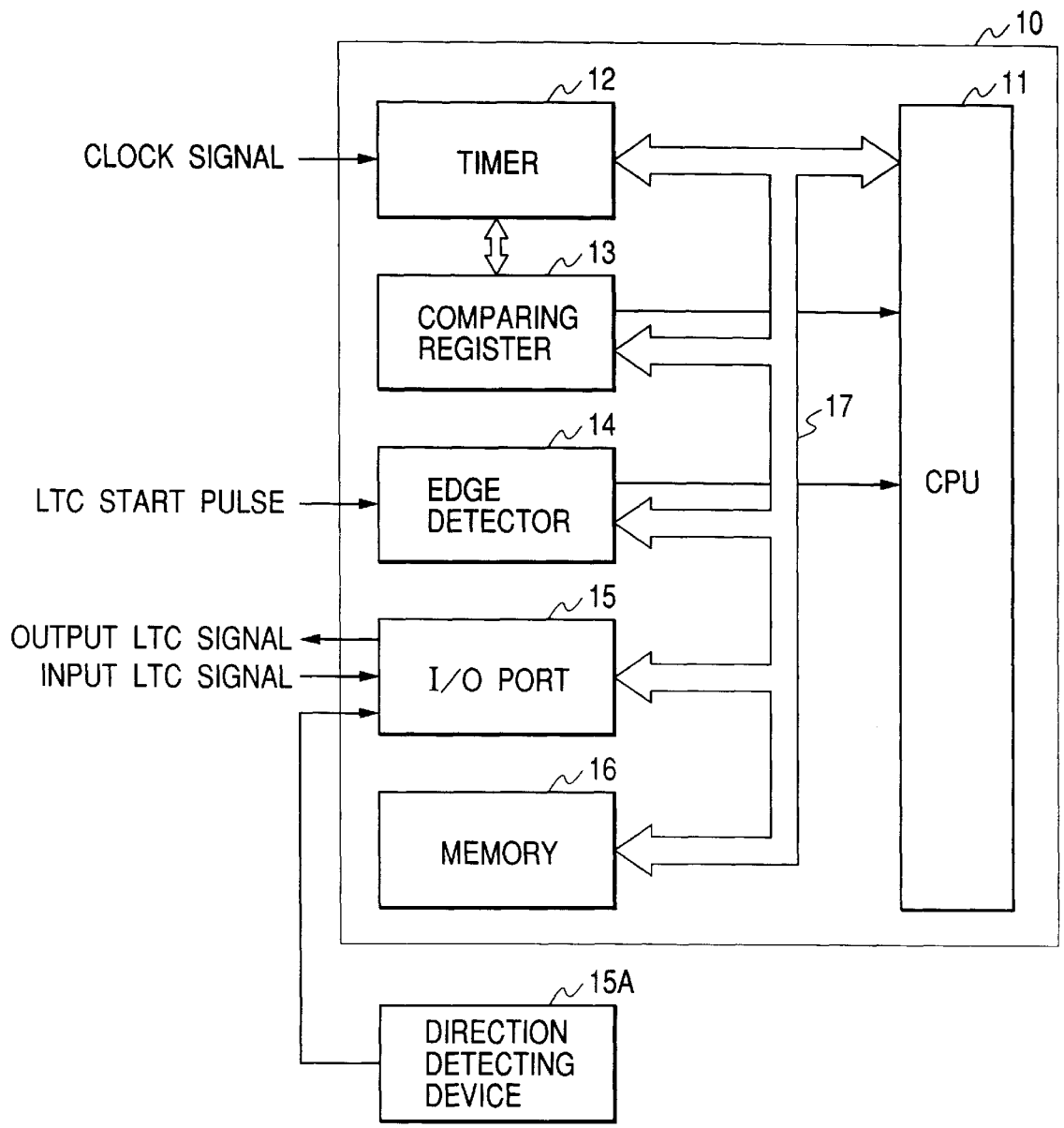
FIG. 4 is a block diagram of an apparatus for generating an LTC signal according to a first embodiment of this invention.

FIG. 4 shows an apparatus 10 for generating an LTC signal which is provided in, for example, the reproducing-side VTR 31 (see FIG. 3). The apparatus 10 of FIG. 4 includes a central processing unit (CPU) 11, a timer 12, a comparing register 13, an edge detector 14, an input/output (I/O) port 15, and a memory 16. The devices 11, 12, 13, 14, 15, and 16 are connected via a bus 17. The CPU 11 operates in accordance with a program stored in its internal ROM (read only memory).

During a playback mode of operation of the reproducing-side VTR 31, an LTC signal is reproduced from an original magnetic tape (an object to be edited) while a video signal and an audio signal are also reproduced therefrom. The reproduced LTC signal is transmitted via the I/O port 15 to the CPU 11. According to the program, the CPU 11 subjects the reproduced LTC signal to bi-phase mark demodulation to detect the logic state of every bit in the reproduced LTC signal. Thus, the CPU 11 recovers every bit in the reproduced LTC signal. The CPU 11 stores the recovered bits of the reproduced LTC signal into the memory 16. Specifically, the CPU 11 stores the recovered bits of the reproduced LTC signal into the memory 16 frame by frame (that is, 80 bits by 80 bits or 1-frame-corresponding segment by 1-frame-corresponding segment). Each of the 80 bits of the reproduced LTC signal in the memory 16 corresponds to an information piece representing a "1"-corresponding pulse width or a "0"-corresponding pulse width.

Figure 5:
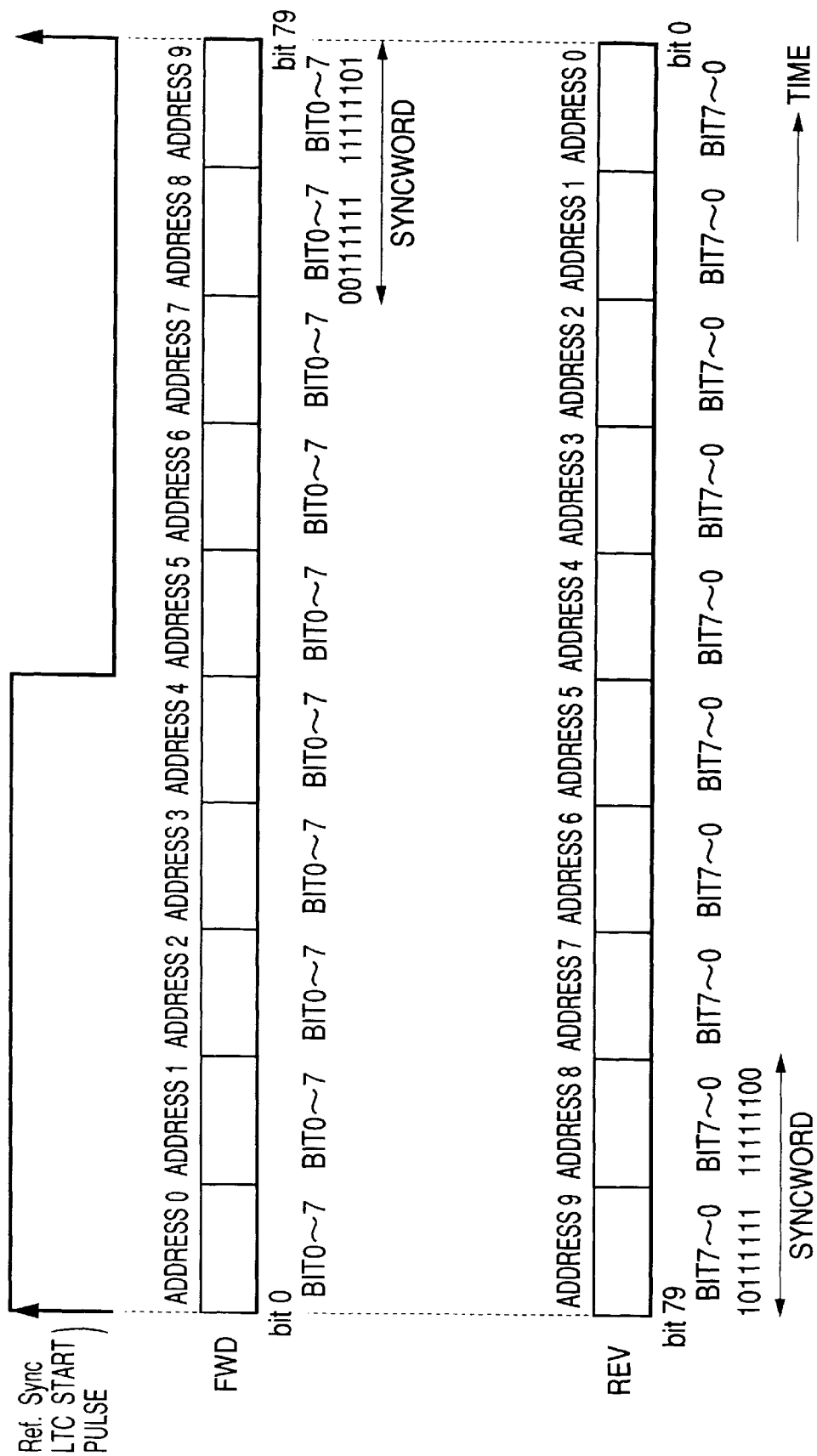
FIG. 5 is a time-domain diagram of an LTC start pulse signal, a 1-frame-corresponding set of 80 bits of an LTC signal reproduced when a magnetic tape is fed in a forward direction, and a 1-frame-corresponding set of 80 bits of an LTC signal reproduced when a magnetic tape is fed in a reverse direction.

With reference to FIG. 5, in the reproducing-side VTR 31, LTC start pulses (reference sync pulses) are generated in synchronism with 1-frame-corresponding segments of the reproduced LTC signal. At the leading edge (the positive going edge of every LTC start pulse, a 1-frame-corresponding segment of the reproduced LTC signal starts.

As shown in FIG. 5, during forward-direction playback, bits "0", "1", "2", "79" of a 1-frame-corresponding segment of the reproduced LTC signal are sequentially arranged in that order. The bits "0", "1", "2", ..., "63" represent updatable time ("hour", "minute", "second", and "frame"). The bits "64", "65", ..., "79" compose a 16-bit sync word having a fixed bit pattern "00111111 11111101". The 80 bits are separated into 10 groups each having 8 successive bits. The 10 groups are referred to as addresses which are given serial numbers as "0", "1", ..., "9". In each of the addresses "0", "1", ..., "9", 8 bits are referred to as BIT "0", BIT "1", BIT "2", BIT "3", BIT "4", BIT "5", BIT "6", and BIT "7" respectively.

As shown in FIG. 5, during reverse-direction playback, bits "79", "78", "76", ..., "1", "0" of a 1-frame-corresponding segment of the reproduced LTC signal are sequentially arranged in that order. The bits "79", "78", ..., "64" compose a 16-bit sync word having a fixed sync pattern "10111111 11111100". The bits "63", "62", ..., "0" represent updatable time ("hour", "minute", "second", and "frame"). Addresses "9", "8", ..., "1", "0" are sequentially arranged in that order. In each of the addresses "9", "8", ..., "1", "0", BIT "7", BIT "6", BIT "5", BIT "4", BIT "3", BIT "2", BIT "1", and BIT "0" are sequentially arranged in that order.

During playback, a suitable device 15A in the reproducing-side VTR 31 detects the direction of the feed of the original magnetic tape. The direction detecting device 15A generates a tape-movement-direction signal representing whether the original magnetic tape is fed in the normal direction or the reverse direction, that is, whether playback is of the normal-direction type or the reverse-direction type. The tape-movement-direction signal is transmitted from the direction detecting device 15A to the CPU 11 via the I/O port 15. The LTC start pulses are applied to the edge detector 14. The leading edge of every LTC start pulse is detected by the edge detector 14. The edge detector 14 outputs an interruption signal to the CPU 11 in response to the leading edge of every LTC start pulse. A segment of the program for outputting a 1-frame-corresponding segment of an LTC signal is started by the interruption signal through an interruption process.

The timer 12 receives a clock signal from a clock signal generator (not shown). The clock signal has a predetermined frequency. The timer 12 counts pulses of the clock signal, and thereby generates a timer signal representing an updatable time value or a lapse of time. The timer 12 outputs the timer signal to the CPU 11 and the comparing register 13.

When the LTC output segment of the program is started, the CPU 11 inverts the logic state of a signal (an output LTC signal) at an output terminal of the I/O port 15 which is assigned to an output LTC signal. Then, the CPU 11 selects a first bit from among the 80 bits in the memory 16 in response to the tape-movement-direction signal. Specifically, the first selected bit agrees with a bit "0", that is, a BIT "0" in an address "0" when the tape-movement-direction signal represents the forward direction. On the other hand, the first selected bit agrees with a bit "79", that is, a BIT "7" in an address "9" when the tape-movement-direction signal represents the reverse direction. The CPU 11 reads out the first selected bit from the memory 16. The CPU 11 generates an information piece representing a pulse width which corresponds to the first selected bit. In addition, the CPU 11 samples the timer signal outputted from the timer 12. The CPU 11 adds the pulse width represented by the information piece and the time value represented by the sampled timer signal. The CPU 11 loads the comparing register 13 with a signal representing the addition result.

When the time value currently represented by the output signal of the timer 12 becomes equal to the addition result, the comparing register 13 outputs a trigger pulse to the CPU 11. The CPU 11 inverts the logic state of the signal (the output LTC signal) at the LTC signal output terminal of the I/O port 15 in response to the trigger pulse. Thus, a bi-phase mark modulation resultant segment of the reproduced LTC signal which corresponds to the first selected bit among the 80 bits is outputted from the I/O port 15. Then, the CPU 11 selects a second bit from among the 80 bits in the memory 16 in response to the tape-movement-direction signal. Specifically, the second selected bit agrees with a bit "1", that is, a BIT "1" in the address "0" when the tape-movement-direction signal represents the forward direction. On the other hand, the second selected bit agrees with a bit "78", that is, a BIT "6" in the address "9" when the tape-movement-direction signal represents the reverse direction. The CPU 11 reads out the second selected bit from the memory 16. The CPU 11 generates an information piece representing a pulse width which corresponds to the second selected bit. In addition, the CPU 11 samples the timer signal outputted from the timer 12. The CPU 11 adds the pulse width represented by the information piece and the time value represented by the sampled timer signal. The CPU 11 loads the comparing register 13 with a signal representing the new addition result. In other words, the CPU 11 updates the signal in the comparing register 13 in accordance with the new addition result. When the time value currently represented by the output signal of the timer 12 becomes equal to the addition result, the comparing register 13 outputs a trigger pulse to the CPU 11. The CPU 11 inverts the logic state of the signal (the output LTC signal) at the LTC signal output terminal of the I/O port 15 in response to the trigger pulse. Thus, a bi-phase mark modulation resultant segment of the reproduced LTC signal which corresponds to the second selected bit among the 80 bits is outputted from the I/O port 15. The above-mentioned processes are iteratively executed until a bi-phase mark modulation resultant segment of the reproduced LTC signal which corresponds to the last bit among the 80 bits is outputted from the I/O port 15.

Accordingly, the 1-bit-corresponding segments of the bi-phase mark modulation resultant LTC signal are sequentially outputted from the I/O port 15. In the case where the tape-movement-direction signal represents the forward direction, the order of the outputting of the 1-bit-corresponding segments of the bi-phase mark modulation resultant LTC signal agrees with a sequence of bits "0", "1", ..., "79". In the case where the tape-movement-direction signal represents the reverse direction, the order of the outputting of the 1-bit-corresponding segments of the bi-phase mark modulation resultant LTC signal agrees with a sequence of bits "79", "78", ..., "0".

Figure 6:
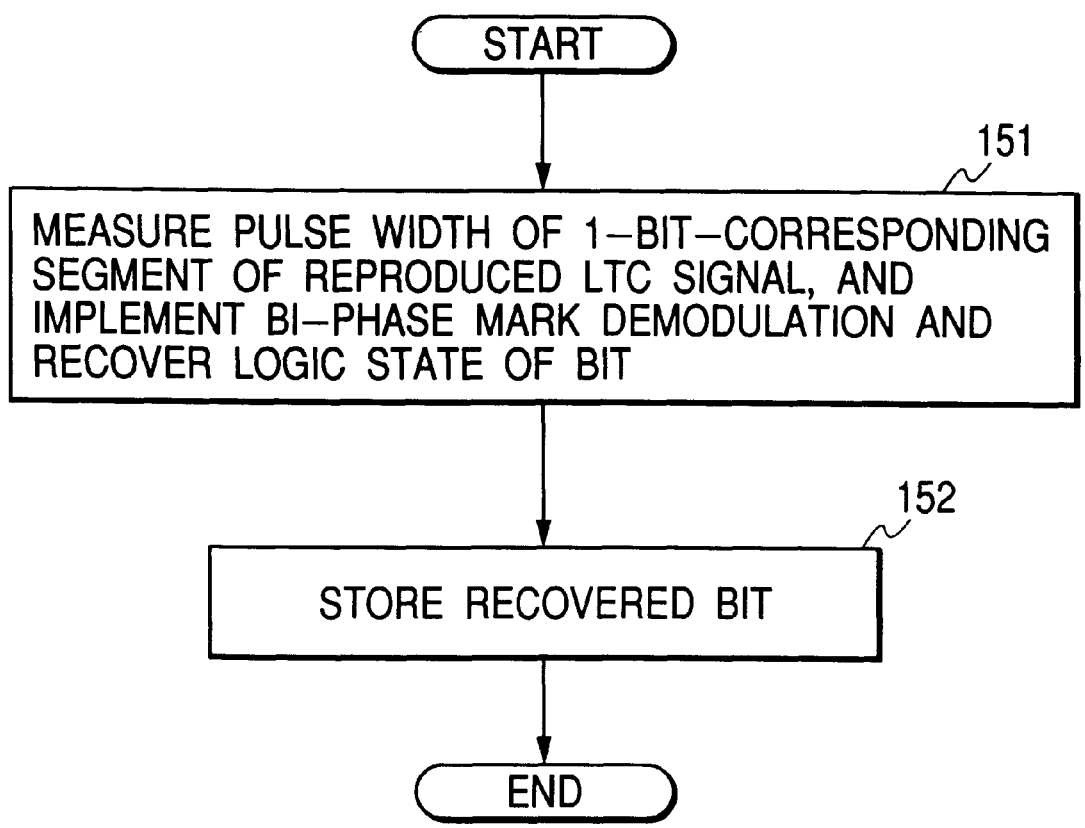
FIG. 6 is a flowchart of a first segment of a program for a CPU in FIG. 4.

FIG. 6 is a flowchart of a segment of the program for the CPU 11 which is iteratively executed at a period corresponding to "bit" related to the reproduced LTC signal.

As shown in FIG. 6, a first step 151 of the program segment measures a pulse width of a current 1-bit-corresponding segment of the reproduced LTC signal, and thereby implements bi-phase mark demodulation and recovers the logic state of a current bit represented by the reproduced LTC signal.

A step 152 following the step 151 stores the current bit recovered by the step 151 into a RAM (random access memory) within the CPU 11. After the step 152, the current execution cycle of the program segment ends.

Figure 7:
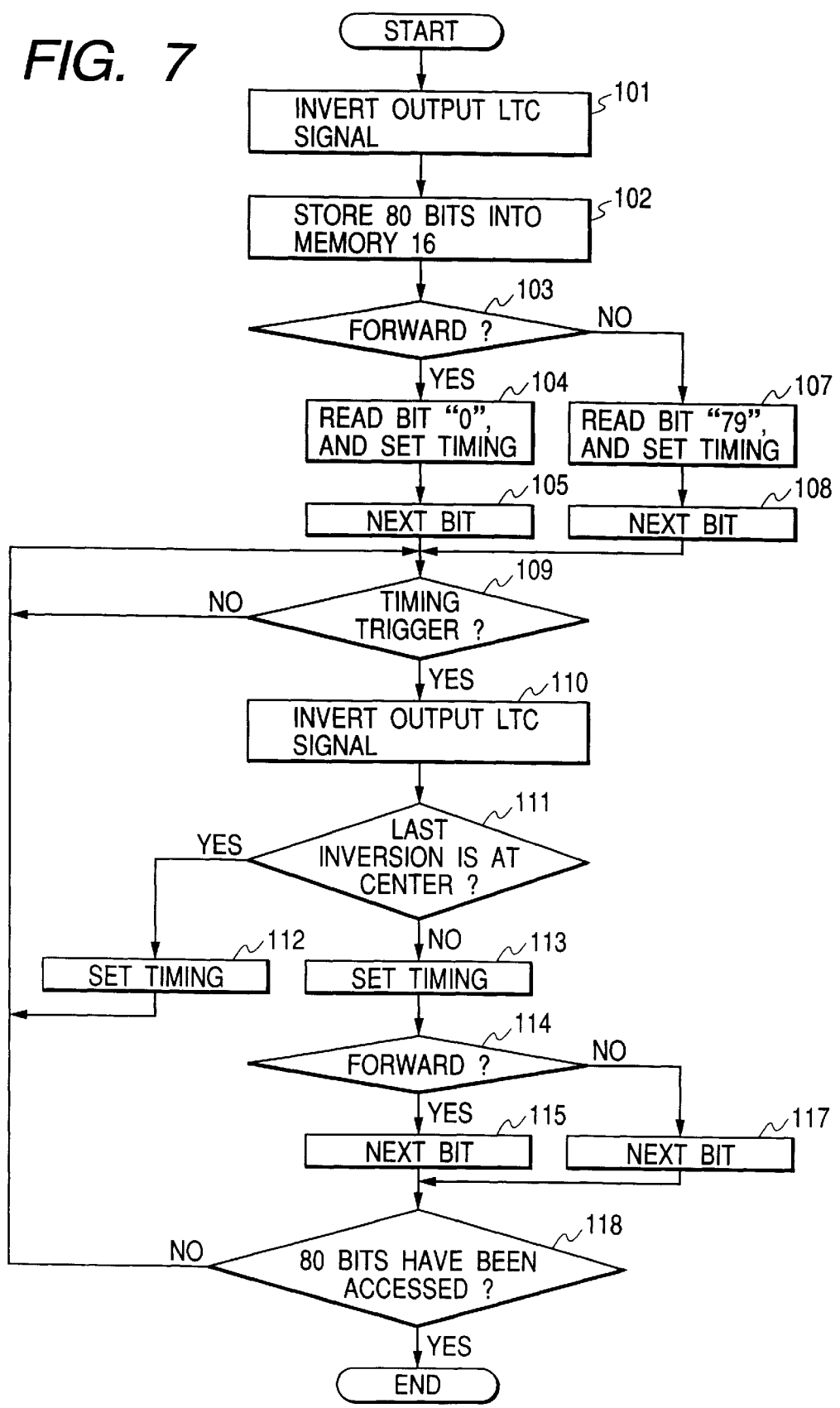
FIG. 7 is a flowchart of a second segment of the program for the CPU in FIG. 4.

FIG. 7 is a flowchart of a segment of the program for the CPU 11 which is designed to output an LTC signal via the I/O port 15. The program segment in FIG. 7 is started by an interruption process responsive to every interruption signal outputted from the edge detector 14. The program segment in FIG. 6 and the program segment in FIG. 7 are executed on a time sharing basis.

As shown in FIG. 7, a first step 101 of the program segment controls the I/O port 15, and thereby inverts the logic state of the signal (the output LTC signal) at the LTC signal output terminal of the I/O port 15.

A step 102 following the step 101 stores a 1-frame-corresponding set of the latest 80 recovered bits, which have been given during the execution of the program segment in FIG. 6, into the memory 16.

A step 103 subsequent to the step 102 decides whether the tape-movement-direction signal represents the forward direction or the reverse direction. When the tape-movement-direction signal represents the forward direction, the program advances from the step 103 to a step 104. When the tape-movement-direction signal represents the reverse direction, the program advances from the step 103 to a step 107.

The step 104 reads out the bit "0" from the memory 16. The step 104 decides a pulse width corresponding to the logic state of the bit "0". The step 104 samples the timer signal outputted from the timer 12. The step 104 adds the decided pulse width to the time value represented by the sampled timer signal. The step 104 loads the comparing register 13 with a signal representing the addition result.

A step 105 following the step 104 designates the bit "1" as a bit among the 80 bits in the memory 16 which is to be accessed next. After the step 105, the program advances to a step 109.

The step 107 reads out the bit "79" from the memory 16. The step 107 decides a pulse width corresponding to the logic state of the bit "79". The step 107 samples the timer signal outputted from the timer 12. The step 107 adds the decided pulse width to the time value represented by the sampled timer signal. The step 107 loads the comparing register 13 with a signal representing the addition result.

A step 108 following the step 107 designates the bit "78" as a bit among the 80 bits in the memory 16 which is to be accessed next. After the step 108, the program advances to the step 109.

The step 109 decides whether or not a trigger pulse is currently outputted from the comparing register 13. When a trigger pulse is currently outputted from the comparing register 13, the program advances from the step 109 to a step 110. Otherwise, the step 109 is repeated.

The step 110 controls the I/O port 15, and thereby inverts the logic state of the signal (the output LTC signal) at the LTC signal output terminal of the I/O port 15.

A step 111 subsequent to the step 110 decides whether or not the last inversion by the step 110 corresponds to an inversion at a central point of a 1-bit-corresponding period. When the last inversion corresponds to an inversion at a central point of a 1-bit-corresponding period, the program advances from the step 111 to a step 112. Otherwise, the program advances from the step 111 to a step 113.

The step 112 samples the timer signal outputted from the timer 12. The step 112 adds a latter half of the 1-bit-corresponding period to the time value represented by the sampled timer signal. The step 112 loads the comparing register 13 with a signal representing the addition result. After the step 112, the program returns to the step 109.

The step 113 reads out the bit from the memory 16 which is designated as a bit among the 80 bits in the memory 16 which is to be accessed next. The step 113 decides a pulse width corresponding to the logic state of the readout bit. The step 113 samples the timer signal outputted from the timer 12. The step 113 adds the decided pulse width to the time value represented by the sampled timer signal. The step 113 loads the comparing register 13 with a signal representing the addition result.

A step 114 following the step 113 decides whether the tape-movement-direction signal represents the forward direction or the reverse direction. When the tape-movement-direction signal represents the forward direction, the program advances from the step 114 to a step 115. When the tape-movement-direction signal represents the reverse direction, the program advances from the step 114 to a step 117.

The step 115 designates one of the 80 bits in the memory 16 which is to be accessed next. The newly designated bit has an order number which is greater than the order number of the immediately-preceding designated bit by "1". After the step 115, the program advances to a step 118.

The step 117 designates one of the 80 bits in the memory 16 which is to be accessed next. The newly designated bit has an order number which is smaller than the order number of the immediately-preceding designated bit by "1". After the step 117, the program advances to the step 118.

The step 118 decides whether or not the 80 bits in the memory 16 have been accessed. When the 80 bits in the memory 16 have been accessed, the program exits from the step 118 and then the current execution cycle of the program segment ends. When the 80 bits in the memory 16 have not yet been accessed, the program returns from the step 118 to the step 109.

Second Embodiment

Figure 8:
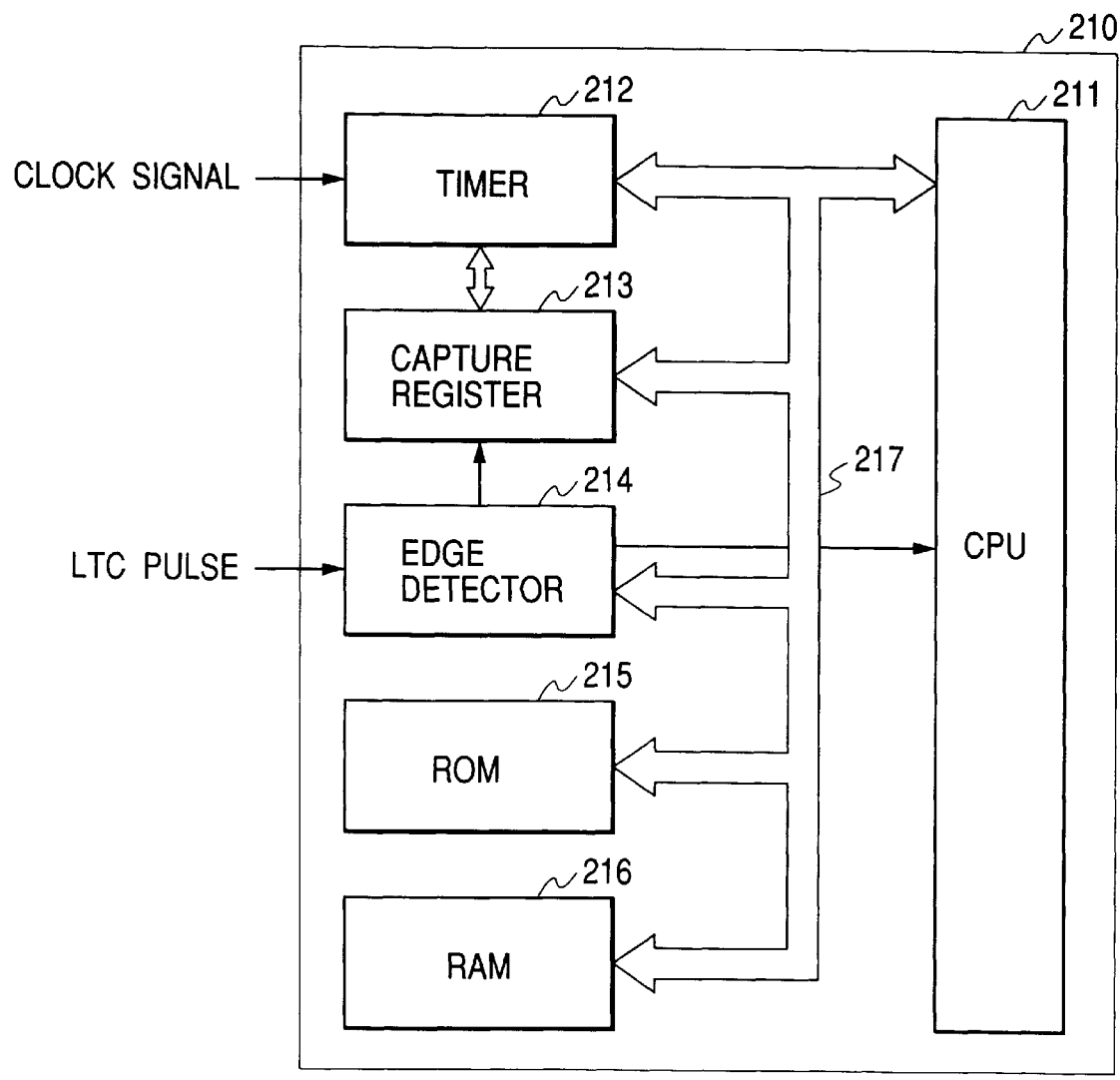
FIG. 8 is a block diagram of an apparatus for reading out an LTC signal according to a second embodiment of this invention.

With reference to FIG. 8, an apparatus 210 for reading out an LTC signal includes a central processing unit (CPU) 211, a timer 212, a capture register 213, an edge detector 214, a read only memory (ROM) 215, and a random access memory (RAM) 216. The devices 211, 212, 213, 214, 215, and 216 are connected via a bus 217. The CPU 211 operates in accordance with a program stored in the ROM 215.

Every 1-frame-corresponding segment of a reproduced LTC signal represents 80 bits, that is, bits "0", "1", "2", ..., "79". The 80 bits are separated into 10 groups each having 8 successive bits. The 10 groups are referred to as addresses which are given serial numbers as "0", "1", ..., "9". In each of the addresses "0", "1", ..., "9", 8 bits are referred to as BIT "0", BIT "1", BIT "2", BIT "3", BIT "4", BIT "5", BIT "6", and BIT "7" respectively. The addresses "0", "1", ..., "9" are defined as corresponding to different states of an LTC address pointer respectively. BIT "0", BIT "1", BIT "2", BIT "3", BIT "4", BIT "5", BIT "6", and BIT "7" are defined as corresponding to different states of an LTC bit pointer. The 16 bits in the addresses "8" and "9", that is, the bits "64", "65", ..., "79" compose a 16-bit sync word having a fixed bit pattern "00111111 11111101". Thus, a sync word has 12 successive bits (the bit "66" to the bit 77") in logic states of "1".

The CPU 211 is programmed to recover 80 bits represented by every 1-frame-corresponding segment of the reproduced LTC signal. The CPU 211 is programmed to store the recovered 80 bits into the RAM 216.

The RAM 216 has 80 storage locations assigned to the respective 80 bits represented by every 1-frame-corresponding segment of the reproduced LTC signal. The 80 storage locations in the RAM 216 are grouped into 10 sets corresponding to the addresses "0", "1", ..., "9"

respectively. Each of the 10 sets has 8 storage locations. The 8 storage locations in each of the 10 sets correspond to BIT "0", BIT "1", BIT "2", BIT "3", BIT "4", BIT "5", BIT "6", and BIT "7" respectively. Accordingly, any one of the 80 storage locations can be designated by a combination of the LTC address pointer and the LTC bit pointer.

An external apparatus reproduces an LTC signal from a magnetic tape. The external apparatus outputs the reproduced LTC signal to a waveform shaping circuit (not shown). The reproduced LTC signal is converted by the waveform shaping circuit into a binary LTC signal (an LTC pulse signal). The waveform shaping circuit outputs the binary LTC signal to the edge detector 214. The edge detector 214 senses every rising edge and every falling edge in the binary LTC signal. The edge detector 214 outputs an interruption signal to the CPU 211 in response to every sensed edge in the binary LTC signal. Also, the edge detector 214 outputs a latch pulse to the capture register 213 in response to every sensed edge in the binary LTC signal.

The timer 212 receives a clock signal from an external clock signal generator. The clock signal has a predetermined frequency. The timer 212 counts pulses of the clock signal, and thereby generates a timer signal representing an updatable time value or a lapse of time. The timer 212 outputs the timer signal to the CPU 211 and the capture register 213.

The capture register 213 latches (samples and holds) the output signal of the timer 212 in response to every latch pulse outputted from the edge detector 214. The timer signal latched by the capture register 213 is stored into the RAM 216 by the CPU 211.

Figure 9:
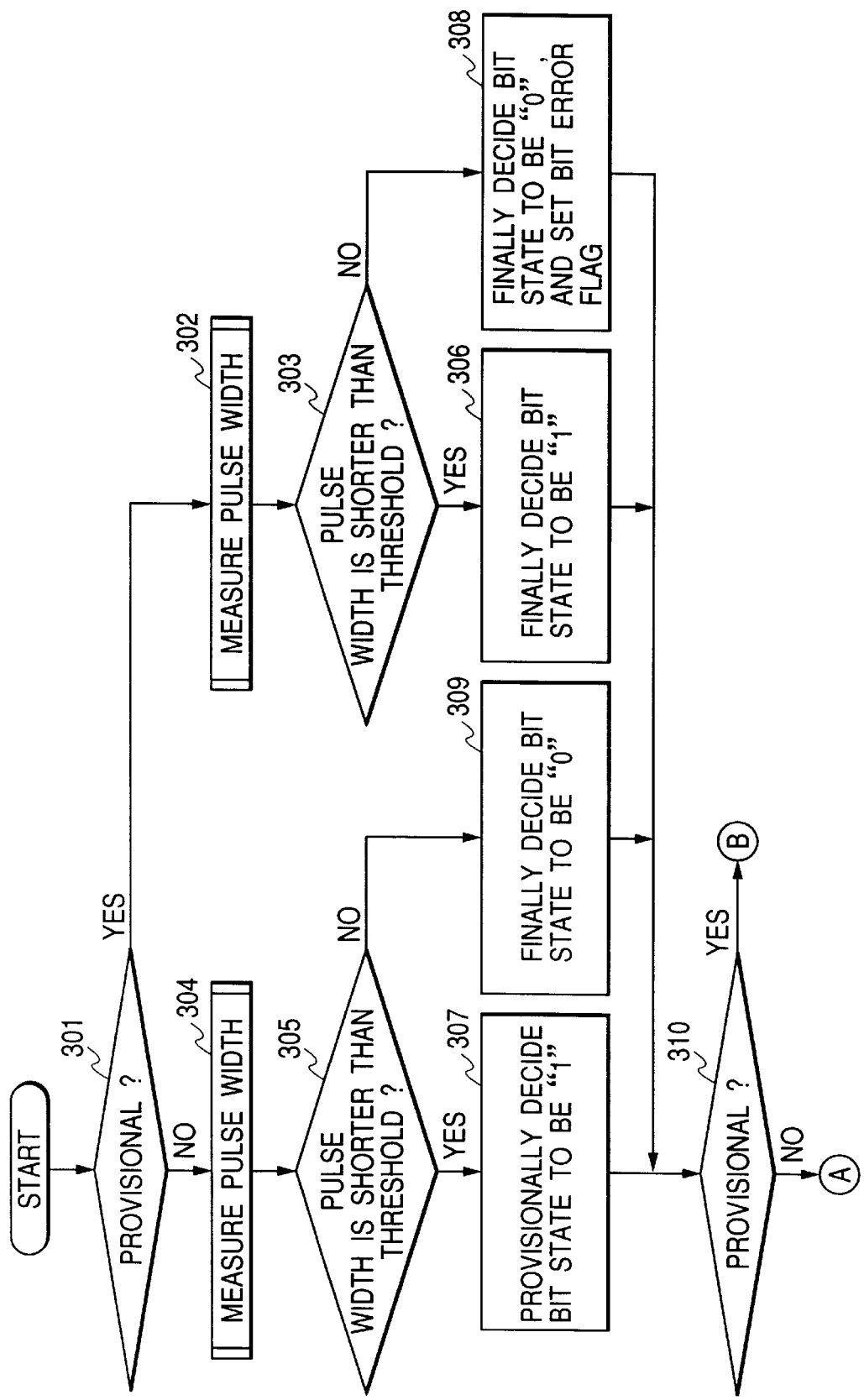
FIGS. 9 and 10 are a flowchart of a first segment of a program for a CPU in FIG. 8.
Figure 10:
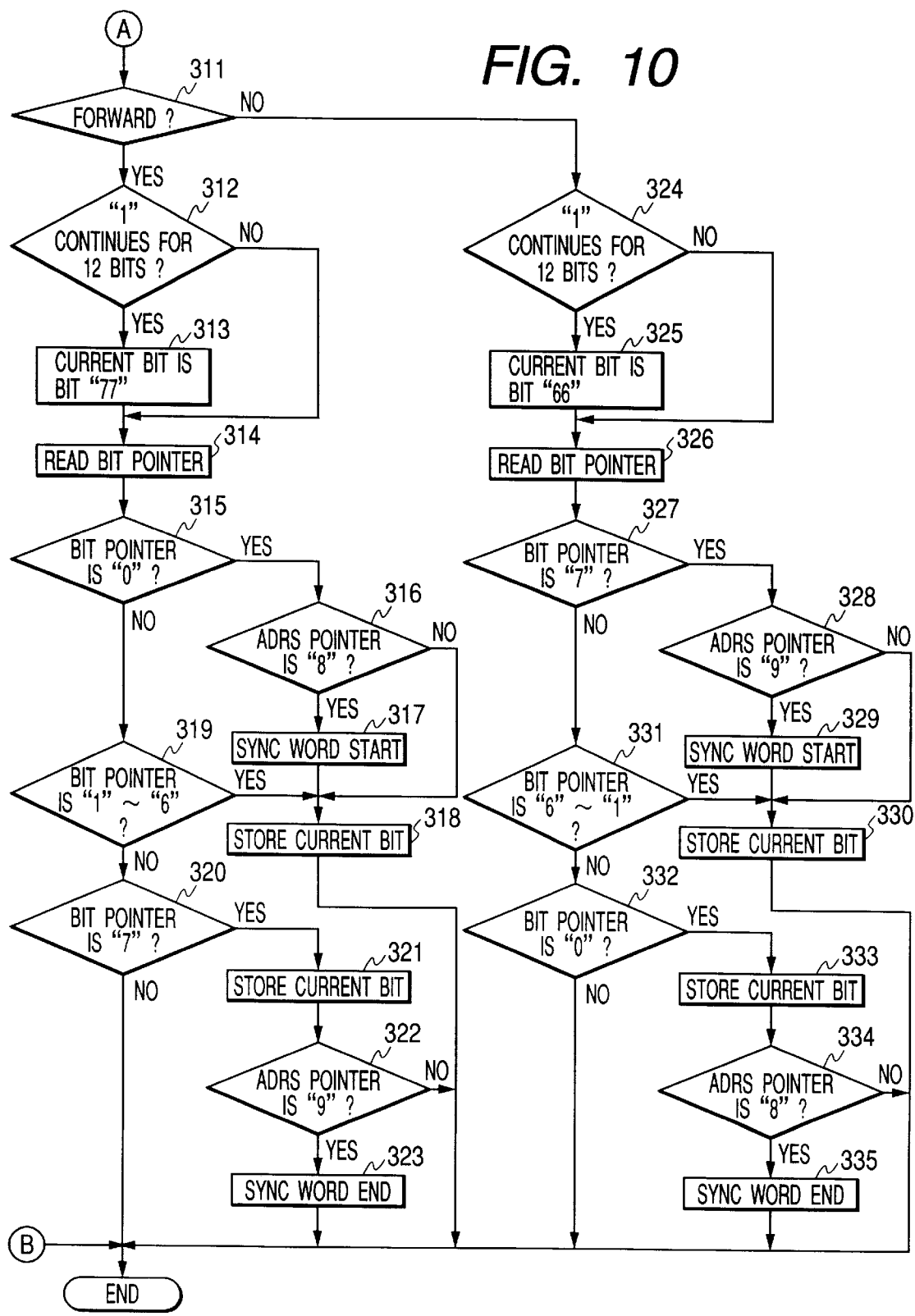

The CPU 211 operates in accordance with a program stored in the ROM 216. FIGS. 9 and 10 are a flowchart of a segment of the program which is designed to decide the logic state of every bit represented by the binary LTC signal. The program segment in FIGS. 9 and 10 implements bi-phase mark demodulation for recovering a bit from the pulse width or the pulse widths in every 1-bit-corresponding segment of the binary LTC signal. The program segment in FIGS. 9 and 10 is started by every interruption signal fed from the edge detector 214.

With reference to FIGS. 9 and 10, a first step 301 of the program segment decides whether the logic state of the bit corresponding to the last pulse width has been finally or provisionally decided. When the logic state of the bit corresponding to the last pulse width has been provisionally decided, the program advances from the step 301 to a step 302. When the logic state of the bit corresponding to the last pulse width has been finally decided, the program advances from the step 301 to a step 304.

The step 302 measures the current pulse width (the present pulse width) in response to the output signal of the edge detector 214 and the output signal of the timer 212. Specifically, the current pulse width is defined as the difference between the time value represented by the timer signal at the occurrence of the falling edge in the binary LTC signal and the time value represented by the timer signal at the occurrence of the immediately-following rising edge in the binary LTC signal.

A step 303 following the step 302 reads out information of a threshold value from the RAM 216. The step 303 decides whether or not the current pulse width is shorter than the threshold value. The threshold value is equal to three fourths of the second immediately-preceding pulse width. When the current pulse width is shorter than the threshold value, the program advances from the step 303 to a step 306. Otherwise, the program advances from the step 303 to a step 308.

The step 304 measures the current pulse width (the present pulse width) in response to the output signal of the edge detector 214 and the output signal of the timer 212 as the step 302 does.

A step 305 following the step 304 reads out information of the threshold value from the RAM 216. The step 305 decides whether or not the current pulse width is shorter than the threshold value. The threshold value is equal to three fourths of the last pulse width. When the current pulse width is shorter than the threshold value, the program advances from the step 305 to a step 307. Otherwise, the program advances from the step 305 to a step 309.

The step 306 finally decides that the current bit (the present bit) is in a logic state of "1". The step 306 increments a sync word check count value by "1" to start or continue counting successive bits in logic states of "1". The step 306 adds the immediately-preceding pulse width and a half of the current pulse width. The step 306 sets the addition result as a new threshold value. In other words, the step 306 updates the threshold value into the addition result. The step 306 stores information of the new threshold value into the RAM 216. After the step 306, the program advances to a step 310.

The step 307 provisionally decides that the current bit (the present bit) is in a logic state of "1". The step 307 stores information of the current pulse width into the RAM 216. After the step 307, the program advances to the step 310.

The step 308 finally decides that the current bit (the present bit) is in a logic state of "0". The step 308 resets the sync word check count value to "0" to terminate counting successive bits in logic states of "1". The step 308 sets three fourths of the current pulse width as a new threshold value. In other words, the step 308 updates the threshold value into three fourths of the current pulse width. The step 308 stores information of the new threshold value into the RAM 216. After the step 308, the program advances to the step 310.

In addition, the step 308 detects an erroneous condition in which the current bit is finally decided to be in a logic state of "0" after it is provisionally decided to be in a logic state of "1". When the erroneous condition is detected, the step 308 sets a bit error flag to a logic state of "1". Otherwise, the step 308 holds the bit error flag in a logic state of "0". The step 308 stores the bit error flag into the RAM 216. After the step 308, the program advances to the step 310.

The step 309 finally decides that the current bit (the present bit) is in a logic state of "0". The step 309 resets the sync word check count value to "0" to terminate counting successive bits in logic states of "1". The step 309 sets three fourths of the current pulse width as a new threshold value. In other words, the step 309 updates the threshold value into three fourths of the current pulse width. The step 309 stores information of the new threshold value into the RAM 216. After the step 309, the program advances to the step 310.

The step 310 decides whether the logic state of the bit corresponding to the last pulse width has been finally or provisionally decided. When the logic state of the bit corresponding to the last pulse width has been finally decided, the program advances from the step 310 to a step 311. When the logic state of the bit corresponding to the last pulse width has been provisionally decided, the program exits from the step 310 and then the current execution cycle of the program segment ends.

The step 311 decides whether the magnetic tape is fed in the forward direction or the reverse direction. When the step 311 decides that the magnetic tape is fed in the forward direction, the program advances from the step 311 to a step 312. When the step 311 decides that the magnetic tape is fed in the reverse direction, the program advances from the step 311 to a step 324. During an initial stage, the step 311 is designed to decide that the magnetic tape is fed in the forward direction. After the initial stage, the step 311 implements this decision by referring to the decided logic states of the bits "64", "65", "78", and "79" composing portions of a sync word.

The step 312 decides whether or not there occur 12 successive decided bits in logic states of "1", that is, whether or not all the current decided bit and the 11 former decided bits are in logic states of "1". The step 312 implements this decision by referring to the sync word check count value. When there occur 12 successive decided bits in logic states of "1", the program advances from the step 312 to a step 313. Otherwise, the program jumps from the step 312 to a step 314.

The step 313 determines that the current decided bit is the bit "77". The step 313 sets the LTC bit pointer and the LTC address pointer to values corresponding to the bit "77". Specifically, the step 313 sets the LTC bit pointer and the LTC address pointer to "5" and "9" respectively. The step 313 stores the LTC bit pointer and the LTC address pointer into the RAM 216. After the step 313, the program advances to the step 314.

The step 314 reads out the LTC bit pointer from the RAM 216. A step 315 following the step 314 decides whether or not the LTC bit pointer is "0". When the LTC bit pointer is "0", the program advances from the step 315 to a step 316. Otherwise, the program advances from the step 315 to a step 319.

The step 316 reads out the LTC address pointer from the RAM 216. The step 316 decides whether or not the LTC address pointer is "8". When the LTC address pointer is "8", the program advances from the step 316 to a step 317. Otherwise, the program jumps from the step 316 to a step 318.

The step 317 determines that the current decided bit is the first bit (the start bit) in a sync word. The step 317 changes an LTC check process start flag from "0" to "1". In other words, the step 317 sets the LTC check process start flag to "1". After the step 317, the program advances to the step 318.

The step 319 decides whether or not the LTC bit pointer is one of "1", "2", "3", "4", "5", and "6". When the LTC bit pointer is one of "1", "2", "3", "4", "5", and "6", the program advances from the step 319 to the step 318. Otherwise, the program advances from the step 319 to a step 320.

The step 318 stores the current decided bit into a storage location in the RAM 216 which is designated by the LTC bit pointer and the LTC bit address corresponding to the current decided bit.

After the step 318, the current execution cycle of the program segment ends.

The step 320 decides whether or not the LTC bit pointer is "7". When the LTC bit pointer is "7", the program advances from the step 320 to a step 321. Otherwise, the program exits from the step 320, and then the current execution cycle of the program segment ends.

The step 321 stores the current decided bit into a storage location in the RAM 216 which is designated by the LTC bit pointer and the LTC bit address corresponding to the current decided bit.

A step 322 following the step 321 reads out the LTC address pointer from the RAM 216. The step 322 decides whether or not the LTC address pointer is "9". When the LTC address pointer is "9", the program advances from the step 322 to a step 323.

Otherwise, the program exits from the step 322, and then the current execution cycle of the program segment ends.

The step 323 determines that the current decided bit is the final bit (the end bit) in a sync word. The step 323 resets the LTC check process start flag to "0". After the step 323, the current execution cycle of the program segment ends.

The step 324 decides whether or not there occur 12 successive decided bits in logic states of "1", that is, whether or not all the current decided bit and the 11 former decided bits are in logic states of "1". The step 324 implements this decision by referring to the sync word check count value. When there occur 12 successive decided bits in logic states of "1", the program advances from the step 324 to a step 325. Otherwise, the program jumps from the step 324 to a step 326.

The step 325 determines that the current decided bit is the bit "66". The step 325 sets the LTC bit pointer and the LTC address pointer to values corresponding to the bit "66". Specifically, the step 325 sets the LTC bit pointer and the LTC address pointer to "2" and "8" respectively. The step 325 stores the LTC bit pointer and the LTC address pointer into the RAM 216. After the step 325, the program advances to the step 326.

The step 326 reads out the LTC bit pointer from the RAM 216. A step 327 following the step 326 decides whether or not the LTC bit pointer is "7". When the LTC bit pointer is "7", the program advances from the step 327 to a step 328. Otherwise, the program advances from the step 327 to a step 331.

The step 328 reads out the LTC address pointer from the RAM 216. The step 328 decides whether or not the LTC address pointer is "9". When the LTC address pointer is "9", the program advances from the step 328 to a step 329. Otherwise, the program jumps from the step 328 to a step 330.

The step 329 determines that the current decided bit is the first bit (the start bit) in a sync word as viewed in the reverse direction. The step 329 changes the LTC check process start flag from "0" to "1". In other words, the step 329 sets the LTC check process start flag to "1". After the step 329, the program advances to the step 330.

The step 331 decides whether or not the LTC bit pointer is one of "1", "2", "3", "4", "5", and "6". When the LTC bit pointer is one of "1", "2", "3", "4", "5", and "6", the program advances from the step 331 to the step 330. Otherwise, the program advances from the step 331 to a step 332.

The step 330 stores the current decided bit into a storage location in the RAM 216 which is designated by the LTC bit pointer and the LTC bit address corresponding to the current decided bit. After the step 330, the current execution cycle of the program segment ends.

The step 332 decides whether or not the LTC bit pointer is "0". When the LTC bit pointer is "0", the program advances from the step 332 to a step 333. Otherwise, the program exits from the step 332, and then the current execution cycle of the program segment ends.

The step 333 stores the current decided bit into a storage location in the RAM 216 which is designated by the LTC bit pointer and the LTC bit address corresponding to the current decided bit.

A step 334 following the step 333 reads out the LTC address pointer from the RAM 216. The step 334 decides whether or not the LTC address pointer is "8". When the LTC address pointer is "8", the program advances from the step 334 to a step 335. Otherwise, the program exits from the step 334, and then the current execution cycle of the program segment ends.

The step 335 determines that the current decided bit is the final bit (the end bit) in a sync word as viewed in the reverse direction. The step 335 resets the LTC check process start flag to "0". After the step 335, the current execution cycle of the program segment ends.

Figure 11:
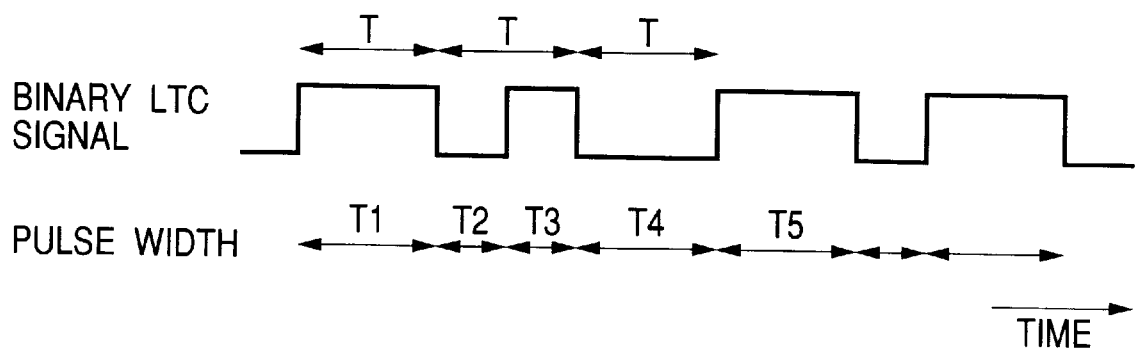
FIG. 11 is a time-domain diagram of a binary LTC signal.

A further explanation will be given of the decision as to the logic state of every bit represented by the binary LTC signal. It is assumed that the binary LTC signal varies in time domain as shown in FIG. 11 where "T" denotes a 1-bit-corresponding period of time, and "T1", "T2", "T3", "T4", and "T5" denote successive pulse widths of the binary LTC signal, respectively. It is also assumed that the bit corresponding to the pulse width T1 has been finally decided to be in a logic state of "0". Three fourths of the pulse width T1 is set as a threshold value. The step 305 in FIG. 9 compares the next pulse width T2 with the threshold value (equal to 0.75·T1). When the pulse width T2 is shorter than the threshold value, the step 307 in FIG. 9 provisionally decides that the bit corresponding to the pulse width T2 is in a logic state of "1". When the pulse width T2 is equal to or longer than the threshold value, the step 309 in FIG. 9 finally decides that the bit corresponding to the pulse width T2 is in a logic state of "0". In addition, the step 309 sets three fourths of the pulse width T2 as a new threshold value. In other words, the step 309 updates the threshold value into three fourths of the pulse width T2. Furthermore, the step 309 resets the sync word check count value.

In the case where the step 307 in FIG. 9 provisionally decides that the bit corresponding to the pulse width T2 is in a logic state of "1", the step 303 in FIG. 9 compares the subsequent pulse width T3 with the threshold value (equal to 0.75·T1). When the pulse width T3 is shorter than the threshold value, the step 306 in FIG. 9 finally decides that the bit corresponding to the pulse width T3 is in a logic state of "1". Accordingly, in the case where the two successive pulse widths T2 and T3 are shorter than the threshold value, it is finally decided that the bit corresponding to the pulse widths T2 and T3 is in a logic state of "1". In this case, the step 306 in FIG. 9 increments the sync word check count value by "1". In addition, the step 306 adds the immediately-preceding pulse width T2 and a half of the current pulse width T3. The step 306 sets the addition result as a new threshold value. In other words, the step 306 updates the threshold value into the addition result. On the other hand, when the pulse width T3 is equal to or longer than the threshold value, the step 308 in FIG. 9 finally decides that the bit corresponding to the pulse widths T2 and T3 is in a logic state of "0". In this case, the step 308 sets the bit error flag to a logic state of "1".

After the logic state of the bit corresponding to the pulse width T3 has been finally decided, the step 304 compares the next pulse width T4 with the threshold value. When the pulse width T4 is equal to or longer than the threshold value, the step 309 in FIG. 9 finally decides that the bit corresponding to the pulse width T4 is in a logic state of "0". In addition, the step 309 sets three fourths of the pulse width T4 as a new threshold value. In other words, the step 309 updates the threshold value into three fourths of the pulse width T4. Furthermore, the step 309 resets the sync word check count value.

Figure 12:
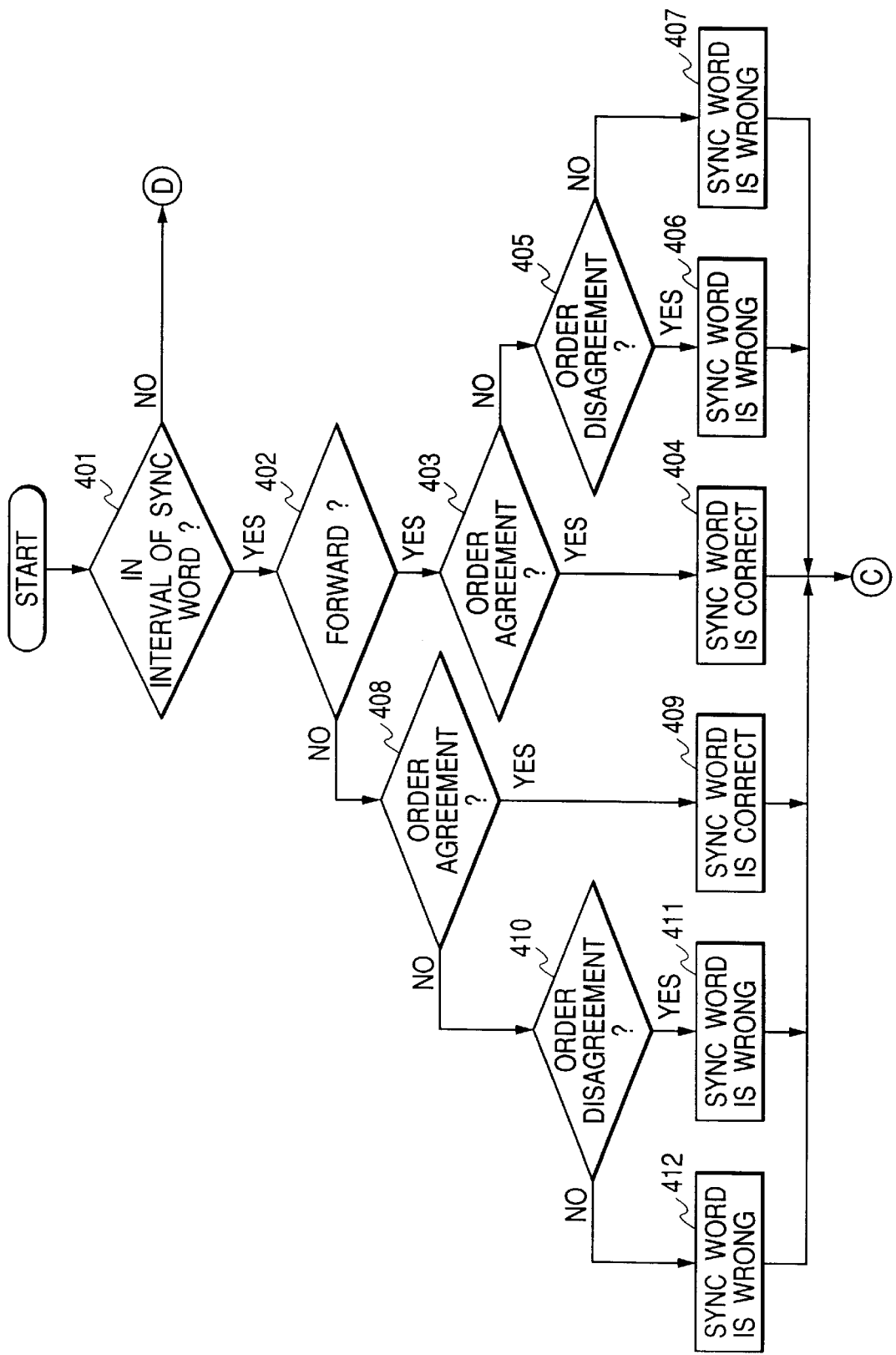
FIGS. 12 and 13 are a flowchart of a second segment of the program for the CPU in FIG. 8.
Figure 13:
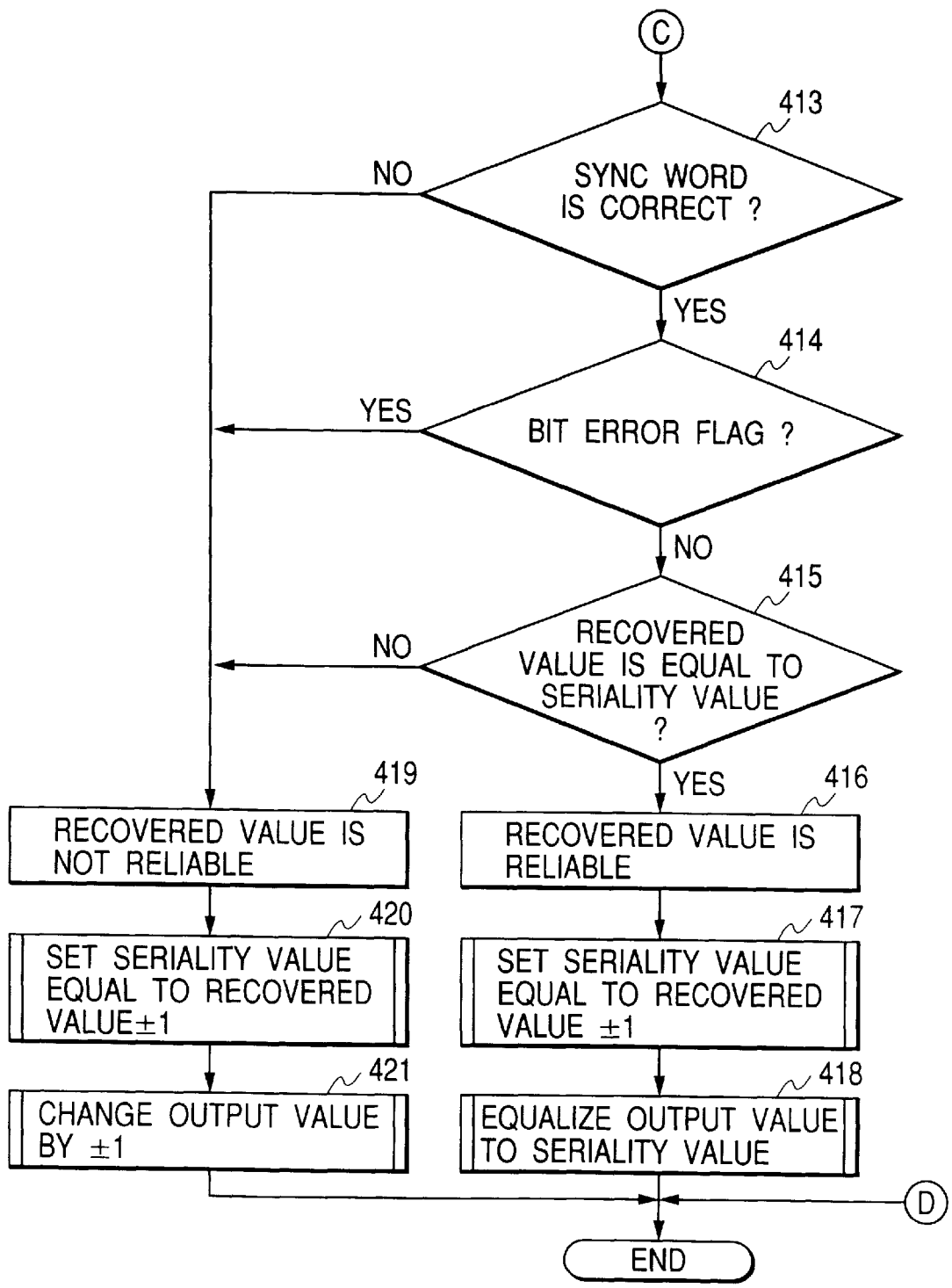

As previously mentioned, the CPU 211 operates in accordance with the program stored in the ROM 216. FIGS. 12 and 13 are a flowchart of another segment of the program which is designed to correct an error in time (a time value) represented by every 1-frame-corresponding set of 80 bits recovered from the binary LTC signal. The program segment in FIGS. 12 and 13 is iteratively executed at a period corresponding to "frame". The program segment in FIGS. 9 and 10, and the program segment in FIGS. 12 and 13 are executed on a time sharing basis. Specifically, the program segment in FIGS. 12 and 13 is started when every 1-frame-corresponding set of 80 recovered bits has been written into the RAM 216 by the program segment in FIGS. 9 and 10.

With reference to FIGS. 12 and 13, a first step 401 of the program segment decides whether or not the present moment is in a time interval of a sync word by referring to the LTC check process start flag. Specifically, the step 401 decides that the present moment is in a time interval of a sync word when the LTC check process start flag is "1". The step 401 decides that the present moment is not in a time interval of a sync word when the LTC check process start flag is "0". In the case where the present moment is in a time interval of a sync word, the program advances from the step 401 to a step 402. Otherwise, the program exits from the step 401, and then the current execution cycle of the program segment ends.

The step 402 reads out the 80 bits, which correspond to one frame, from the RAM 216. The step 402 decodes the 80 bits to a time value ("hour", "minute", "second", and "frame"). Then, the step 402 decides whether or not the magnetic tape is fed in the forward direction. When the magnetic tape is fed in the forward direction, the program advances from the step 402 to a step 403. When the magnetic tape is not fed in the forward direction, that is, when the magnetic tape is fed in the reverse direction, the program advances from the step 402 to a step 408.

The step 403 decides whether or not the arrangement order of 16 bits among the 80 bits which represent a sync word corresponds to the tape feed direction detected in the immediately-preceding execution cycle of the program segment. When the arrangement order of 16 bits of the sync word corresponds to the immediately-preceding tape feed direction, the program advances from the step 403 to a step 404. Otherwise, the program advances from the step 403 to a step 405.

The step 404 decides that the sync word corresponds to the forward direction, and has correct contents. After the step 404, the program advances to a step 413.

The step 405 decides whether or not the arrangement order of 16 bits of the sync word disagrees with the tape feed direction detected in the immediately-preceding execution cycle of the program segment. When the arrangement order of 16 bits of the sync word disagrees with the immediately-preceding tape feed direction, the program advances from the step 405 to a step 406. Otherwise, the program advances from the step 405 to a step 407.

The step 406 decides that the sync word corresponds to the reverse direction, and has wrong contents. After the step 406, the program advances to the step 413.

The step 407 decides that the sync word has wrong contents. After the step 407, the program advances to the step 413.

The step 408 decides whether or not the arrangement order of 16 bits among the 80 bits which represent a sync word corresponds to the tape feed direction detected in the immediately-preceding execution cycle of the program segment. When the arrangement order of 16 bits of the sync word corresponds to the immediately-preceding tape feed direction, the program advances from the step 408 to a step 409. Otherwise, the program advances from the step 408 to a step 410.

The step 409 decides that the sync word corresponds to the reverse direction, and has correct contents. After the step 409, the program advances to the step 413.

The step 410 decides whether or not the arrangement order of 16 bits of the sync word disagrees with the tape feed direction detected in the immediately-preceding execution cycle of the program segment. When the arrangement order of 16 bits of the sync word disagrees with the immediately-preceding tape feed direction, the program advances from the step 410 to a step 411. Otherwise, the program advances from the step 410 to a step 412.

The step 411 decides that the sync word corresponds to the forward direction, and has wrong contents. After the step 411, the program advances to the step 413.

The step 412 decides that the sync word has wrong contents. After the step 412, the program advances to the step 413.

The step 413 decides whether or not the sync word is correct by referring to one of the results of the decisions in the steps 404, 406, 407, 409, 411, and 412. When the sync word is correct, the program advances from the step 413 to a step 414. Otherwise, the program advances from the step 413 to a step 419.

The step 414 decides whether or not the bit error flag is in a logic state of "1". When the bit error flag is in a logic state of "0", the program advances from the step 414 to a step 415. When the bit error flag is in a logic state of "1", the program advances from the step 414 to the step 419.

The step 415 decides whether or not the recovered time value, which has been derived from the 80 bits, is equal to a seriality comparison value. When the recovered time value is equal to the seriality comparison value, the program advances from the step 415 to a step 416. Otherwise, the program advances from the step 415 to the step 419.

The step 416 decides that the recovered time value is reliable. A step 417 following the step 416 sets the seriality comparison value equal to the recovered time value plus "1" when the magnetic tape is fed in the forward direction. The step 417 sets the seriality comparison value equal to the recovered time value minus "1" when the magnetic tape is fed in the reverse direction.

A step 418 subsequent to the step 417 updates an output time value (a final time value to be outputted) in response to the seriality comparison value. Specifically, the step 418 sets the seriality comparison value as a newest output time value. After the step 418, the current execution cycle of the program segment ends.

The step 419 decides that the recovered time value is not reliable. A step 420 following the step 419 sets the seriality comparison value equal to the recovered time value plus "1" when the magnetic tape is fed in the forward direction. The step 420 sets the seriality comparison value equal to the recovered time value minus "1" when the magnetic tape is fed in the reverse direction.

A step 421 subsequent to the step 420 updates the output time value. Specifically, the step 421 increments the output time value by "1" when the magnetic tape is fed in the forward direction. The step 421 decrements the output time value by "1" when the magnetic tape is fed in the reverse direction. After the step 421, the current execution cycle of the program segment ends.

A further explanation will be given of the error correction implemented by the program segment in FIGS. 12 and 13.

Figure 14:
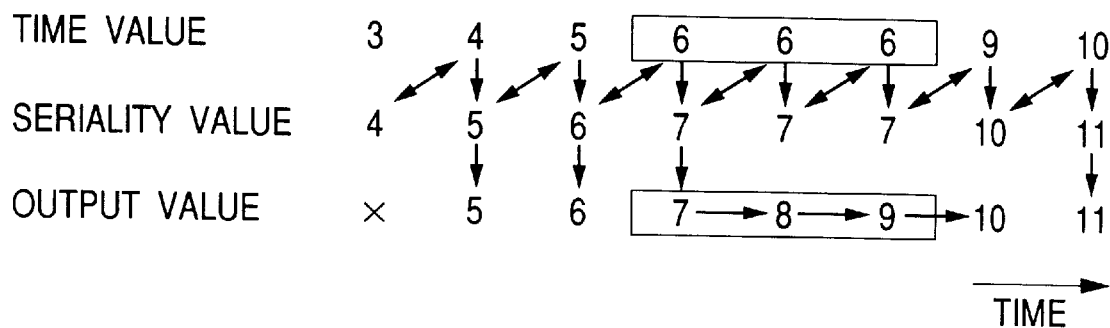
FIG. 14 is a time-domain diagram of first conditions of a recovered time value, a seriality comparison value, and an output time value generated in the apparatus of FIG. 8.

With reference to FIG. 14, it is assumed that the magnetic tape is fed in the forward direction, and the recovered time value derived from a 1-frame-corresponding set of 80 recovered bits varies as "3→4→5→6→6→6→9→10". Thus, the recovered time value is held "6" for three successive 1-frame-corresponding periods. In addition, it is assumed that the seriality comparison value is "4" when the time value is "3".

With reference to FIG. 14, during a second 1-frame-corresponding period, the recovered time value of "4" which immediately follows the recovered time value of "3" is compared by the step 415 with the seriality comparison value of "4". Since the recovered time value of interest is equal to the seriality comparison value, the steps 416, 417, and 418 are successively executed after the step 415. The magnetic tape is fed in the forward direction, and thus the step 417 sets the seriality comparison value equal to the recovered time value plus "1". In other words, the step 417 increases the seriality comparison value to "5". The step 418 equalizes the output time value to the seriality comparison value. In other words, the step 418 sets the output time value to "5".

During a third 1-frame-corresponding period, the recovered time value is "5" while the seriality comparison value is updated into "6". In addition, the output time value is updated into "6".

During a fourth 1-frame-corresponding period, the recovered time value is "6" while the seriality comparison value is updated into "7". In addition, the output time value is updated into "7".

During a fifth 1-frame-corresponding period, the recovered time value is still "6". The recovered time value of "6" is compared by the step 415 with the seriality comparison value of "7". Since the recovered time value of interest is different from the seriality comparison value, the steps 419, 420, and 421 are successively executed after the step 415. The magnetic tape is fed in the forward direction, and thus the step 420 sets the seriality comparison value equal to the recovered time value plus "1". In other words, the step 420 holds the seriality comparison value equal to "7". Since the magnetic tape is fed in the forward direction, the step 421 increments the output time value "1". In other words, the step 421 updates the output time value into "8".

During a sixth 1-frame-corresponding period, the recovered time value is still "6". The recovered time value of "6" is compared by the step 415 with the seriality comparison value of "7". Since the recovered time value of interest is different from the seriality comparison value, the steps 419, 420, and 421 are successively executed after the step 415. The magnetic tape is fed in the forward direction, and thus the step 420 sets the seriality comparison value equal to the recovered time value plus "1". In other words, the step 420 holds the seriality comparison value equal to "7". Since the magnetic tape is fed in the forward direction, the step 421 increments the output time value "1". In other words, the step 421 updates the output time value into "9".

During a seventh 1-frame-corresponding period, the recovered time value is "9". The recovered time value of "9" is compared by the step 415 with the seriality comparison value of "7". Since the recovered time value of interest is different from the seriality comparison value, the steps 419, 420, and 421 are successively executed after the step 415. The magnetic tape is fed in the forward direction, and thus the step 420 sets the seriality comparison value equal to the recovered time value plus "1". In other words, the step 420 increases the seriality comparison value to "10". Since the magnetic tape is fed in the forward direction, the step 421 increments the output time value "1". In other words, the step 421 updates the output time value into "10".

During an eighth 1-frame-corresponding period, the recovered time value is "10" while the seriality comparison value is updated into "11". In addition, the output time value is updated into "11".

In this way, the output time value is serially increased as "5→6→7→8→9→10→11" while the recovered time value varies as "4→5→6→6→6→9→10". This means that the recovered time value held "6" for three successive 1-frame-corresponding periods is corrected, and the output time value is serially increased.

Figure 15:
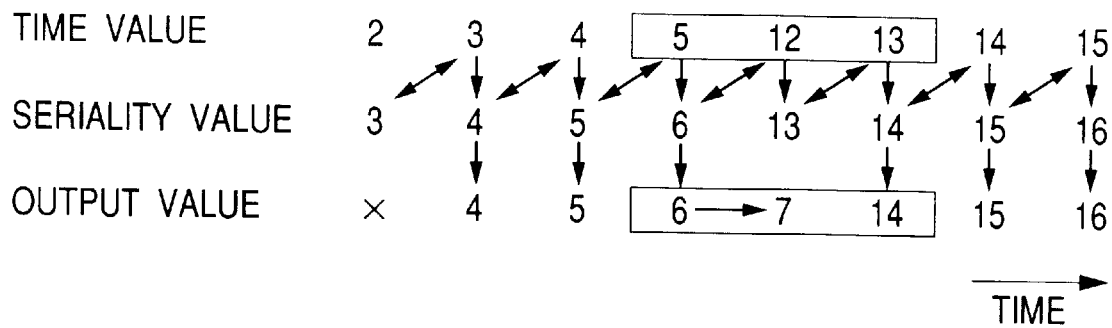
FIG. 15 is a time-domain diagram of second conditions of the recovered time value, the seriality comparison value, and the output time value generated in the apparatus of FIG. 8.

With reference to FIG. 15, it is assumed that the magnetic tape is fed in the forward direction, and the recovered time value derived from a 1-frame-corresponding set of 80 recovered bits varies as "2→3→4→5→12→13→14→15". Thus, the recovered time value skips from "5" to "12" during two successive 1-frame-corresponding periods. In addition, it is assumed that the seriality comparison value is "3" when the time value is "2".

With reference to FIG. 15, during a second 1-frame-corresponding period, the recovered time value of "3" which immediately follows the recovered time value of "2" is compared by the step 415 with the seriality comparison value of "3". Since the recovered time value of interest is equal to the seriality comparison value, the steps 416, 417, and 418 are successively executed after the step 415. The magnetic tape is fed in the forward direction, and thus the step 417 sets the seriality comparison value equal to the recovered time value plus "1". In other words, the step 417 increases the seriality comparison value to "4". The step 418 equalizes the output time value to the seriality comparison value. In other words, the step 418 sets the output time value to "4".

During a third 1-frame-corresponding period, the recovered time value is "4" while the seriality comparison value is updated into "5". In addition, the output time value is updated into "5".

During a fourth 1-frame-corresponding period, the recovered time value is "5" while the seriality comparison value is updated into "6". In addition, the output time value is updated into "6".

During a fifth 1-frame-corresponding period, the recovered time value is "12". The recovered time value of "12" is compared by the step 415 with the seriality comparison value of "6". Since the recovered time value of interest is different from the seriality comparison value, the steps 419, 420, and 421 are successively executed after the step 415. The magnetic tape is fed in the forward direction, and thus the step 420 sets the seriality comparison value equal to the recovered time value plus "1". In other words, the step 420 increases the seriality comparison value to "13". Since the magnetic tape is fed in the forward direction, the step 421 increments the output time value "1". In other words, the step 421 updates the output time value into "7".

During a sixth 1-frame-corresponding period, the recovered time value is "13". The recovered time value of "13" is compared by the step 415 with the seriality comparison value of "13". Since the recovered time value of interest is equal to the seriality comparison value, the steps 416, 417, and 418 are successively executed after the step 415. The magnetic tape is fed in the forward direction, and thus the step 417 sets the seriality comparison value equal to the recovered time value plus "1". In other words, the step 417 increases the seriality comparison value to "14". The step 418 equalizes the output time value to the seriality comparison value. In other words, the step 418 increases the output time value to "14".

During a seventh 1-frame-corresponding period, the recovered time value is "14" while the seriality comparison value is updated into "15". In addition, the output time value is updated into "15".

During an eighth 1-frame-corresponding period, the recovered time value is "15" while the seriality comparison value is updated into "16". In addition, the output time value is updated into "16".

In this way, the output time value is increased as "4→5→6→7→14→15→16" while the recovered time value varies as "3→4→5→12→13→14→15".

Third Embodiment

Figure 16:
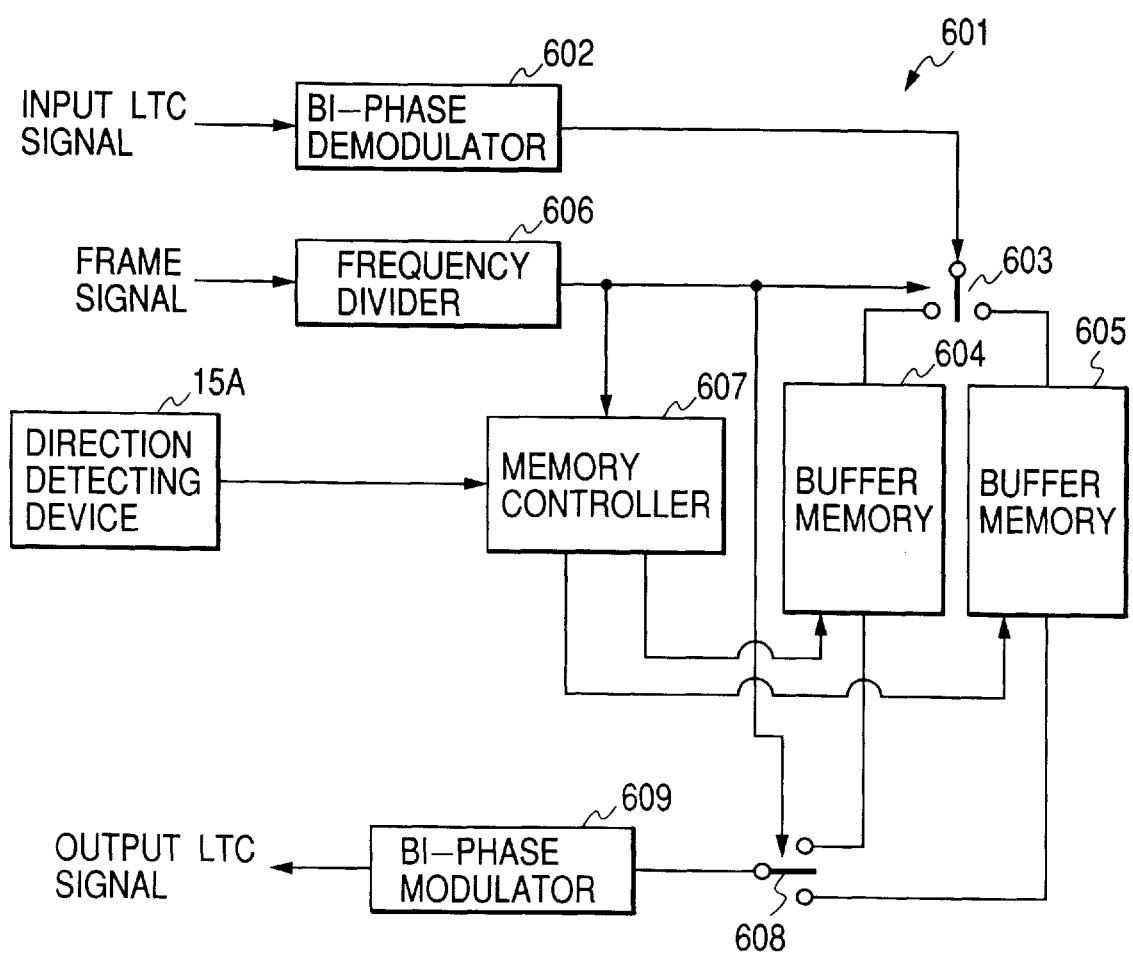
FIG. 16 is a block diagram of an apparatus for rearranging an LTC signal according to a third embodiment of this invention.

FIG. 16 shows an apparatus 601 for rearranging an LTC signal which is provided in, for example, the reproducing-side VTR 31 (see FIG. 3). The apparatus 601 of FIG. 16 includes a bi-phase mark demodulator 602, a switch 603, buffer memories 604 and 605, a frequency divider 606, a memory controller 607, a switch 608, and a bi-phase mark modulator 609.

The bi-phase mark demodulator 602 is connected to the switch 603. The switch 603 is connected to the buffer memories 604 and 605. The buffer memories 604 and 605 are connected to the switch 608. The switch 608 is connected to the bi-phase modulator 609. The frequency divider 606 is connected to the memory controller 607 and the switches 603 and 608. The memory controller 607 is connected to the buffer memories 604 and 605.

In the reproducing-side VTR 31 (see FIG. 3), an LTC signal is reproduced from a magnetic tape. The bi-phase mark demodulator 602 receives the reproduced LTC signal. The bi-phase mark demodulator 602 subjects the reproduced LTC signal to bi-phase mark demodulation, thereby converting the reproduced LTC signal into a demodulation-resultant LTC signal having a sequence of bits. The bi-phase mark demodulator 602 outputs the demodulation-resultant LTC signal to the switch 603.

The switch 603 selectively transmits the demodulation-resultant LTC signal to either the buffer memory 604 or the buffer memory 605. Each of the buffer memories 604 and 605 has a capacity corresponding to at least 80 bits. The buffer memory 604 stores first alternate 1-frame-corresponding segments (odd-numbered 1-frame-corresponding segments) of the demodulation-resultant LTC signal. The first alternate 1-frame-corresponding segments of the demodulation-resultant LTC signal are read out from the buffer memory 604 in a normal bit sequence direction or a reverse bit sequence direction before being fed to the switch 608. The buffer memory 605 stores second alternate 1-frame-corresponding segments (even-numbered 1-frame-corresponding segments) of the demodulation-resultant LTC signal. The second alternate 1-frame-corresponding segments of the demodulation-resultant LTC signal are read out from the buffer memory 604 in a normal bit sequence direction or a reverse bit sequence direction before being fed to the switch 608.

The switch 608 selectively connects the bi-phase mark modulator 609 to either the buffer memory 604 or the buffer memory 605. The first alternate 1-frame-corresponding segments of the demodulation-resultant LTC signal are transmitted via the switch 608 to the bi-phase mark modulator 609. The second alternate 1-frame-corresponding segments of the demodulation-resultant LTC signal are transmitted via the switch 608 to the bi-phase mark modulator 609. The switch 608 combines or multiplexes the first alternate 1-frame-corresponding segments of the demodulation-resultant LTC signal and the second alternate 1-frame-corresponding segments of the demodulation-resultant LTC signal into an rearrangement-resultant LTC bit sequence.

The bi-phase mark modulator 609 receives the rearrangement-resultant LTC bit sequence from the switch 608. The bi-phase mark modulator 609 subjects the rearrangement-resultant LTC bit sequence to bi-phase mark modulation, thereby converting the rearrangement-resultant LTC bit sequence into a modulation-resultant LTC signal. The bi-phase mark modulator 609 outputs the modulation-resultant LTC signal to an external device (not shown).

In the reproducing-side VTR 31 (see FIG. 3), a frame-synchronized rectangular pulse signal is generated which has a given frequency and a given period corresponding to "frame". The rectangular pulse signal is also referred to as the frame pulse signal. The frequency divider 606 receives the frame pulse signal. The frequency divider 606 halves the frequency of the frame pulse signal, thereby generating and outputting a signal having a period corresponding to twice "frame". For example, the output signal of the frequency divider 606 is in a high-level state during first alternate 1-frame-corresponding periods (odd-numbered 1-frame-corresponding periods) related to the output signal of the bi-phase mark demodulator 602, and is in a low-level state during second alternate 1-frame-corresponding periods (even-numbered 1-frame-corresponding periods) related to the output signal of the bi-phase mark demodulator 602.

The switch 603 receives the output signal of the frequency divider 606. The switch 603 changes in response to the output signal of the frequency divider 606. During the first alternate 1-frame-corresponding periods, the switch 603 transmits the demodulation-resultant LTC signal to the buffer memory 604. During the second alternate 1-frame-corresponding periods, the switch 603 transmits the demodulation-resultant LTC signal to the buffer memory 605.

The switch 608 receives the output signal of the frequency divider 606. The switch 608 changes in response to the output signal of the frequency divider 606. During the first alternate 1-frame-corresponding periods, the switch 608 connects the bi-phase mark modulator 609 to the buffer memory 605. During the second alternate 1-frame-corresponding periods, the switch 608 connects the bi-phase mark modulator 609 to the buffer memory 604.

In the reproducing-side VTR 31 (see FIG. 3), a suitable device 15A detects the direction of the feed of the magnetic tape. The direction detecting device 15A generates a tape-movement-direction signal representing whether the magnetic tape is fed in the normal direction or the reverse direction. The tape-movement-direction signal is transmitted from the direction detecting device 15A to the memory controller 607. Also, the output signal of the frequency divider 606 is applied to the memory controller 607.

The device 607 controls the buffer memories 604 and 605 in response to the tape-movement-direction signal and the output signal of the frequency divider 606. During each of the first alternate 1-frame-corresponding periods, the memory controller 607 outputs a write enabling signal and a suitable address signal to the buffer memory 604 so that a related 1-frame-corresponding set of 80 bits of the demodulation-resultant LTC signal are sequentially written into the buffer memory 604. During each of the second alternate 1-frame-corresponding periods, the memory controller 607 outputs a write enabling signal and a suitable address signal to the buffer memory 605 so that a related 1-frame-corresponding set of 80 bits of the demodulation-resultant LTC signal are sequentially written into the buffer memory 605.

During each of the first alternate 1-frame-corresponding periods, the memory controller 607 outputs a read enabling signal and an address signal to the buffer memory 605 so that a 1-frame-corresponding set of 80 bits of the demodulation-resultant LTC signal are sequentially read out from the buffer memory 605. In this case, the memory controller 607 generates the address signal in response to the tape-movement-direction signal. The address signal is designed so that when the tape-movement-direction signal represents the forward direction, the order of reading out the 80 bits agrees with the order in which the 80 bits have been written. In other words, when the tape-movement-direction signal represents the forward direction, the buffer memory 605 is operated as a first-in first-out (FIFO) memory. The address signal is also designed so that when the tape-movement-direction signal represents the reverse direction, the order of reading out the 80 bits is opposite to the order in which the 80 bits have been written. In other words, when the tape-movement-direction signal represents the reverse direction, the buffer memory 605 is operated as a last-in first-out (LIFO) memory.

During each of the second alternate 1-frame-corresponding periods, the memory controller 607 outputs a read enabling signal and an address signal to the buffer memory 604 so that a 1-frame-corresponding set of 80 bits of the demodulation-resultant LTC signal are sequentially read out from the buffer memory 604. In this case, the memory controller 607 generates the address signal in response to the tape-movement-direction signal. The address signal is designed so that when the tape-movement-direction signal represents the forward direction, the order of reading out the 80 bits agrees with the order in which the 80 bits have been written. In other words, when the tape-movement-direction signal represents the forward direction, the buffer memory 604 is operated as a first-in first-out (FIFO) memory. The address signal is also designed so that when the tape-movement-direction signal represents the reverse direction, the order of reading out the 80 bits is opposite to the order in which the 80 bits have been written. In other words, when the tape-movement-direction signal represents the reverse direction, the buffer memory 604 is operated as a last-in first-out (LIFO) memory.

In this way, during a 1-frame-corresponding period, the buffer memory 604 is subjected to a signal writing process while the buffer memory 605 is subjected to a signal reading process. During the next 1-frame-corresponding period, the buffer memory 604 is subjected to a signal reading process while the buffer memory 605 is subjected to a signal writing process. When the tape-movement-direction signal represents the forward direction, the buffer memories 604 and 605 are operated as FIFO memories. When the tape-movement-direction signal represents the reverse direction, the buffer memories 604 and 605 are operated as LIFO memories.

What is claimed is:

1. A time code signal generating apparatus comprising:
   a direction detector for detecting a direction of feed of a recording tape;
   a timer for counting pulses of a clock signal, and outputting a signal representing a first count value corresponding to a number of counted pulses;
   first means for generating a second count value corresponding to a pulse width related to a first bit represented by an input time code signal reproduced from the recording tape;

second means for adding the first count value represented by the output signal of the timer at a first time point and the second count value generated by the first means into a first addition-result value;

third means for comparing the first addition-result value generated by the second means and the first count value currently represented by the output signal of the timer to detect that the first count value currently represented by the output signal of the timer comes equal to the first addition-result value generated by the second means;

fourth means for generating an output time code signal;

fifth means for inverting the output time code signal generated by the fourth means when the third means detects that the first count value currently represented by the output signal of the timer comes equal to the first addition-result value generated by the second means;

sixth means for selecting a second bit from among bits represented by the input time code signal in response to the direction detected by the direction detector, wherein the second bit to be selected neighbors the first bit in a normal time direction when the direction detected by the direction detector agrees with a forward direction, and the second bit to be selected neighbors the first bit in a reverse time direction when the direction detected by the direction detector agrees with a reverse direction;

seventh means for generating a third count value corresponding to a pulse width related to the second bit selected by the sixth means;

eighth means for adding the first count value represented by the output signal of the timer at a second time point after the first time point and the third count value generated by the seventh means into a second addition-result value; and ninth means for updating the first addition-result value used by the third means into the second addition-result value generated by the eighth means.

2. A time code signal generating apparatus as recited in claim 1, wherein the input time code signal is recorded on the recording tape in synchronism with every frame represented by a video signal recorded on the recording tape.

3. A time code signal reading apparatus comprising:

an edge detector for detecting every rising edge and every falling edge in an input time code signal, and generating an edge detection signal representative thereof;

first means for detecting pulse widths of the input time code signal in response to the edge detection signal generated by the edge detector;

second means for deciding logic states of bits in response to the pulse widths detected by the first means;

third means for generating an active error flag when the pulse widths detected by the first means are arranged in an abnormal order;

fourth means for detecting a sync word represented by the bits in the logic states decided by the second means;

fifth means for deciding whether or not the sync word detected by the fourth means has a predetermined pattern, and generating a pattern decision signal representative thereof;

sixth means for recovers a first time value from the bits in the logic states decided by the second means; and seventh means for correcting the first time value recovered by the sixth means into a second time value in response to the active error flag generated by the third means and the pattern decision signal generated by the fifth means.

4. A time code signal reading apparatus as recited in claim 3, wherein the seventh means comprises:

eighth means for changing the first time value by a given value to convert the first time value to a third time value;

ninth means for setting a seriality comparison value equal to the third time value generated by the eighth means;

tenth means for changing the second time value by a predetermined value to update the second time value;

eleventh means for, in cases where the active error flag is absent and the pattern decision signal represents that the sync word has the predetermined pattern, comparing the first time value with the seriality comparison value set by the ninth means at a previous moment to decide whether the first time value is equal to or different from the seriality comparison value set by the ninth means at the previous moment;

twelfth means for enabling the eighth means, the ninth means, and the tenth means to operate when the eleventh means decides that the first time value is different from the seriality comparison value set by the ninth means at the previous moment;

thirteenth means for changing the first time value by the given value to convert the first time value to the third time value when the eleventh means decides that the first time value is equal to the seriality comparison value set by the ninth means at the previous moment;

fourteenth means for setting the seriality comparison value equal to the third time value generated by the thirteenth means; and fifteenth means for setting the second time value equal to the seriality comparison value set by the fourteenth means to update the second time value when the eleventh means decides that the first time value is equal to the seriality comparison value set by the ninth means at the previous moment.

5. A time code signal reading apparatus as recited in claim 4, further comprising a direction detector for detecting a direction of feed of a recording tape from which the input time code signal is reproduced, and wherein the eighth means increments the first time value by the given value when the direction detected by the direction detector agrees with a forward direction, and decrements the first time value by the given value when the direction detected by the direction detector agrees with a reverse direction, wherein the tenth means increments the second time value by the predetermined value when the direction detected by the direction detector agrees with the forward direction, and decrements the second time value by the predetermined value when the direction detected by the direction detector agrees with the reverse direction, and wherein the thirteenth means increments the first time value by the given value when the direction detected by the direction detector agrees with the forward direction, and decrements the first time value by the given value when the direction detected by the direction detector agrees with the reverse direction.

6. A time code signal rearranging apparatus comprising:

a bi-phase demodulator for subjecting a first time code signal reproduced from a magnetic tape to bi-phase demodulation to convert the first time code signal into a first sequence of time code bits;

a direction detector for detecting a direction of feed of the magnetic tape;

first means for dividing the first sequence of time code bits into segments each having a given number of time code bits;

second means for, when the direction detected by the direction detector agrees with a reverse direction, reversing an arrangement order of time code bits in each of the segments generated by the first means to rearrange the first sequence of time code bits into a second sequence of time code bits; and a bi-phase modulator for subjecting the second sequence of time code bits generated by the second means to bi-phase modulation to convert the second sequence of time code bits into a second time code signal.

* * * * *